(12) United States Patent
Nakase

(10) Patent No.: US 9,769,416 B2
(45) Date of Patent: Sep. 19, 2017

(54) IMAGE REPRODUCING APPARATUS AND METHOD FOR CONTROLLING SAME

(71) Applicant: CANON KABUSHIKI KAISHA, Tokyo (JP)

(72) Inventor: Yuichi Nakase, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 93 days.

(21) Appl. No.: 14/580,102

(22) Filed: Dec. 22, 2014

(65) Prior Publication Data

US 2015/0189221 A1 Jul. 2, 2015

(30) Foreign Application Priority Data

Dec. 26, 2013 (JP) .................................. 2013-269683

(51) Int. Cl.
*H04N 5/225* (2006.01)
*H04N 5/77* (2006.01)
(Continued)

(52) U.S. Cl.
CPC ............. *H04N 5/772* (2013.01); *G11B 27/30* (2013.01); *G11B 31/006* (2013.01); *H04N 1/00* (2013.01);
(Continued)

(58) Field of Classification Search
CPC .. H04N 5/772; H04N 1/2112; H04N 5/23293; H04N 2101/00; G11B 27/30;
(Continued)

(56) References Cited

U.S. PATENT DOCUMENTS

| 7,228,061 B2 * | 6/2007 | Mori | H04N 21/8153 |
| | | | 348/E5.099 |
| 2007/0188622 A1* | 8/2007 | Yagi | H04N 5/23245 |
| | | | 348/220.1 |

(Continued)

FOREIGN PATENT DOCUMENTS

| CN | 1829287 A | 9/2006 |
| CN | 102006416 A | 4/2011 |

(Continued)

OTHER PUBLICATIONS

Hamza Khalid, Sep. 1, 2013, "Combine Front & Rear Camera in One Video With eyeReport for iPhone", addictivetips.com, Available from: http://www.addictivetips.com/ios/combine-front-rear-camera-in-one-video-with-eyereport-for-iphone/.

(Continued)

*Primary Examiner* — Thai Tran
*Assistant Examiner* — Syed Hasan
(74) *Attorney, Agent, or Firm* — Canon U.S.A., Inc. IP Division

(57) ABSTRACT

An image reproducing apparatus including a selection unit configured to select a still image to be reproduced, a moving image to be reproduced, and a reproduction range of the moving image from a recording medium in which a plurality of still images and moving images is recorded, and a reproduction control unit configured to perform control to sequentially reproduce the still image and the reproduction range of the moving image selected to be reproduced by the selection unit, the selection unit being configured to perform control so that both a still image and a range of a moving image in which the still image is inserted are not selected to be reproduced.

20 Claims, 14 Drawing Sheets

(51) Int. Cl.

| | |
|---|---|
| *H04N 5/775* | (2006.01) |
| *H04N 5/92* | (2006.01) |
| *H04N 9/80* | (2006.01) |
| *H04N 5/45* | (2011.01) |
| *H04N 21/454* | (2011.01) |
| *G11B 27/30* | (2006.01) |
| *G11B 31/00* | (2006.01) |
| *H04N 5/232* | (2006.01) |
| *H04N 5/907* | (2006.01) |
| *H04N 9/804* | (2006.01) |
| *H04N 9/806* | (2006.01) |
| *H04N 1/00* | (2006.01) |
| *H04N 9/87* | (2006.01) |

(52) U.S. Cl.
CPC ..... *H04N 5/23245* (2013.01); *H04N 5/23293* (2013.01); *H04N 5/45* (2013.01); *H04N 5/907* (2013.01); *H04N 9/806* (2013.01); *H04N 9/8042* (2013.01); *H04N 21/454* (2013.01); *H04N 9/8715* (2013.01)

(58) Field of Classification Search
CPC ..... G11B 27/34; G11B 31/06; G11B 2220/90; G06T 2207/10016
USPC ............... 386/225, 230, 241, 248, 324, 337; 348/220.1, 559
See application file for complete search history.

(56) References Cited

U.S. PATENT DOCUMENTS

| | | | |
|---|---|---|---|
| 2009/0040382 A1* | 2/2009 | Nagaoka | G11B 27/105 348/559 |
| 2011/0025865 A1* | 2/2011 | Kunishige | H04N 5/232 348/220.1 |
| 2011/0055296 A1 | 3/2011 | Shimazaki | |
| 2012/0050571 A1 | 3/2012 | Yang | |
| 2012/0120186 A1 | 5/2012 | Diaz | |
| 2012/0307101 A1 | 12/2012 | Fukuya | |

FOREIGN PATENT DOCUMENTS

| | | |
|---|---|---|
| EP | 1763243 A2 | 3/2007 |
| GB | 2245794 A | 1/1992 |
| JP | H07-282294 A | 10/1995 |
| JP | H10-224727 A | 8/1998 |

OTHER PUBLICATIONS

Hamza Khalid, Aug. 10, 2012, "Signature Camera for iPhone Includes a Shot of the Photographer in Captured Photos", addictivetips.com, Available from: http://www.addictivetips.com/ios/signature-camerasnap-photos-using-front-back-iphone-cameras-simultaneously/.

\* cited by examiner

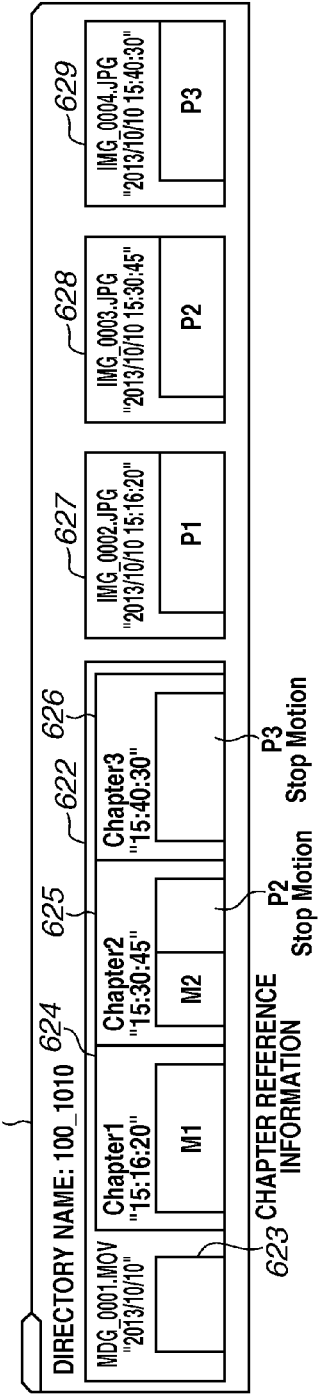

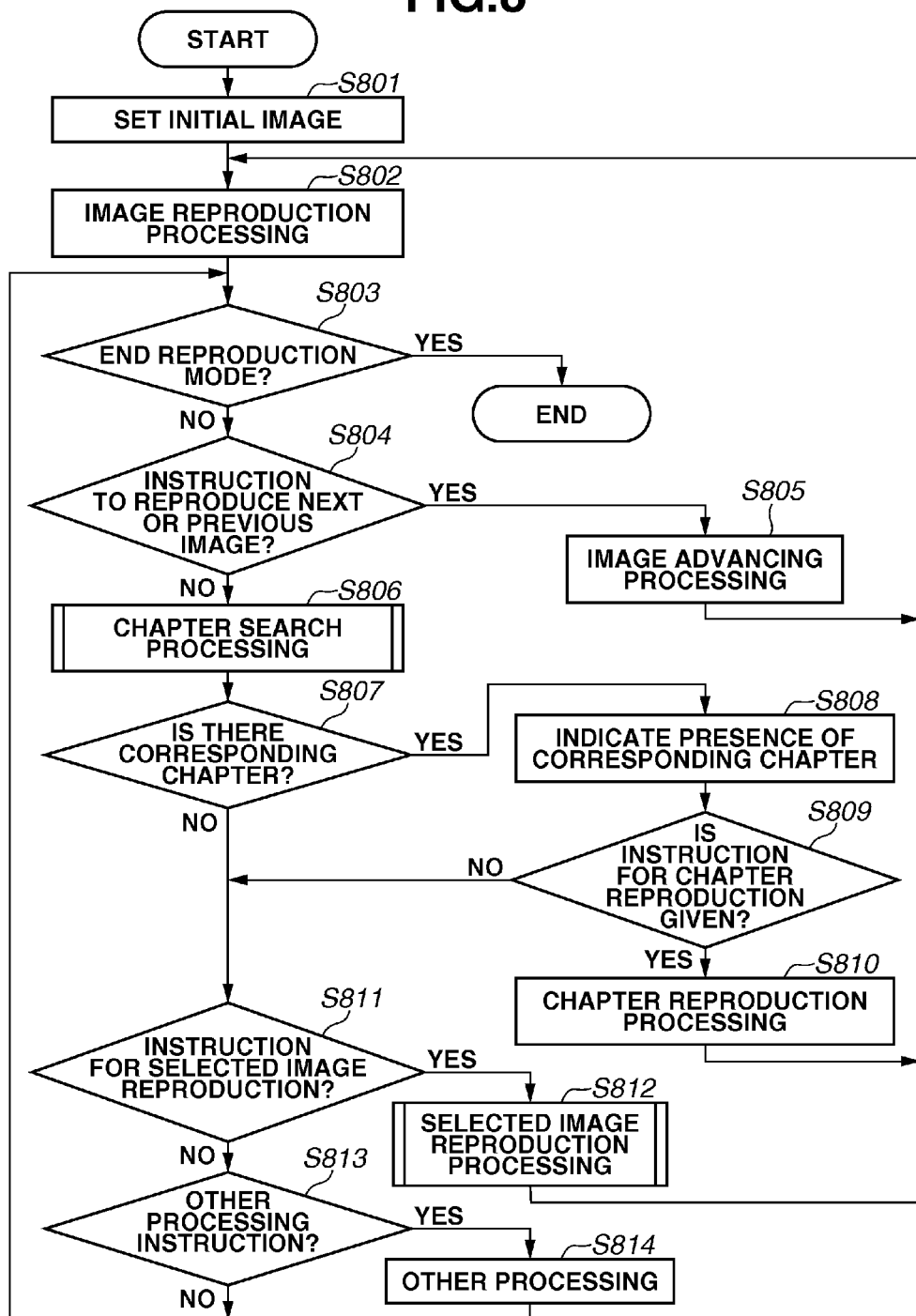

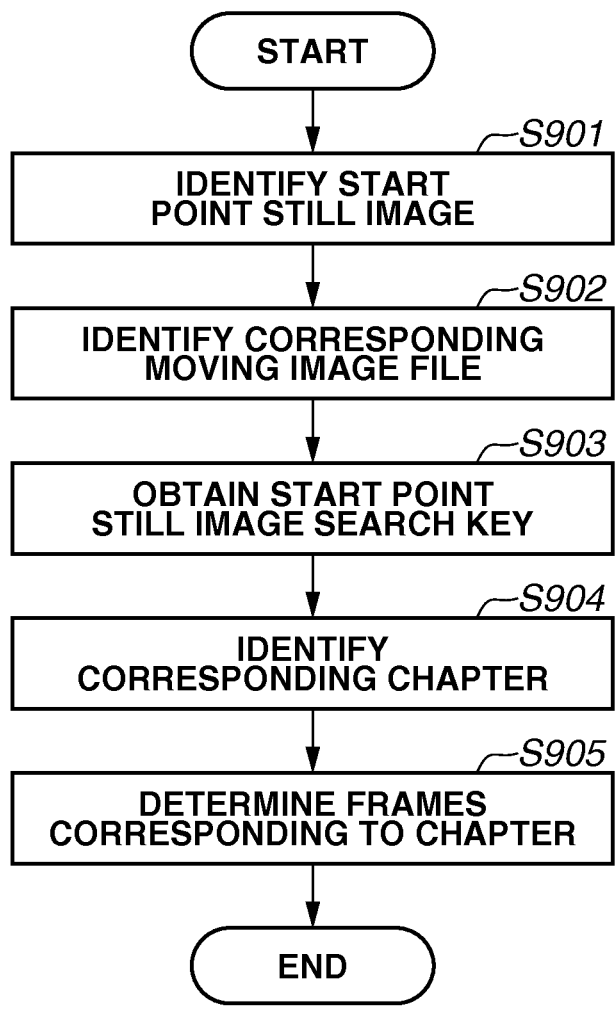

FIG.10A

| TimeLine | -3sec | -2sec | -1sec | 0 (STILL IMAGE CAPTURING) |
|---|---|---|---|---|
| AF OPERATION | STOPPED | IN OPERATION | STOPPED | STOPPED |
| ZOOM CONTROL STATE | IN OPERATION | STOPPED | STOPPED | STOPPED |
| ROTATION ORIENTATION | 0° | 0° | 0° | 0° |
| DEGREE OF SMILE | LOW | LOW | LOW | LOW |

FIG.10B

| TimeLine | -3sec | -2sec | -1sec | 0 (STILL IMAGE CAPTURING) |
|---|---|---|---|---|
| AF OPERATION | IN OPERATION | IN OPERATION | IN OPERATION | STOPPED |

FIG.10C

| TimeLine | -3sec | -2sec | -1sec | 0 (STILL IMAGE CAPTURING) |
|---|---|---|---|---|
| ZOOM CONTROL STATE | IN OPERATION | IN OPERATION | IN OPERATION | STOPPED |

FIG.10D

| TimeLine | -3sec | -2sec | -1sec | 0 (STILL IMAGE CAPTURING) |
|---|---|---|---|---|
| ROTATION ORIENTATION | 0° | 0° | 90° | 90° |

FIG.10E

| TimeLine | -3sec | -2sec | -1sec | 0 (STILL IMAGE CAPTURING) |
|---|---|---|---|---|
| DEGREE OF SMILE | MEDIUM | HIGH | HIGH | HIGH |

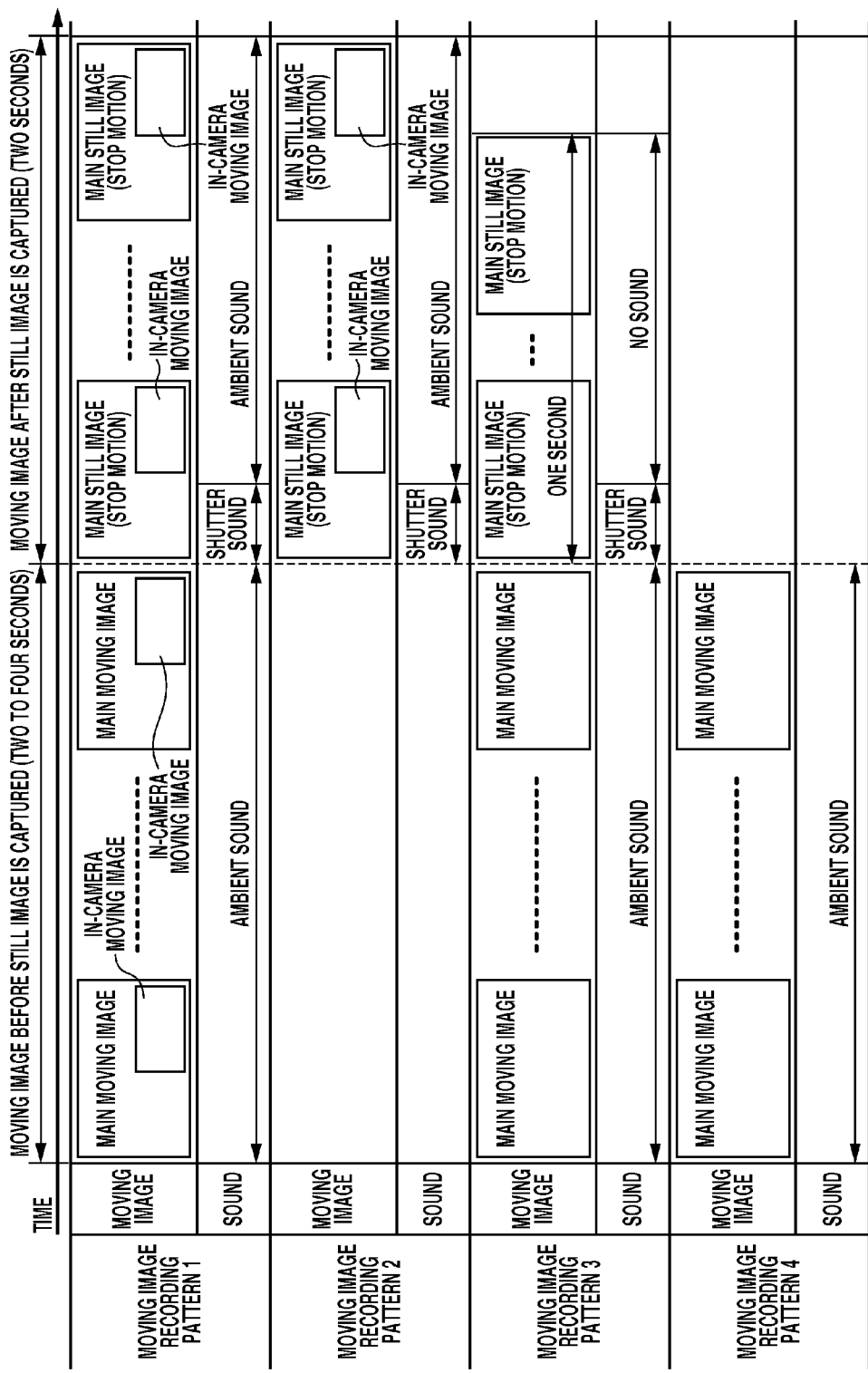

FIG.14

| IN-CAMERA PHOTOGRAPHING FUNCTION | RECORDING TIME OF MOVING IMAGE DATA BEFORE STILL IMAGE IS CAPTURED | STOP MOTION SETTING | MOVING IMAGE RECORDING PATTERN |
|---|---|---|---|
| ENABLED | ≥ t0 (TWO SECONDS OR MORE) | — | MOVING IMAGE RECORDING PATTERN 1 |
| ENABLED | < t0 (LESS THAN 2 SECONDS) | — | MOVING IMAGE RECORDING PATTERN 2 |
| DISABLED | < t0 (LESS THAN 2 SECONDS) | — | NO MOVING IMAGE RECORDED |
| DISABLED | ≥ t0 (TWO SECONDS OR MORE) | ON | MOVING IMAGE RECORDING PATTERN 3 |
| DISABLED | ≥ t0 (TWO SECONDS OR MORE) | OFF | MOVING IMAGE RECORDING PATTERN 4 |

IMAGE REPRODUCING APPARATUS AND METHOD FOR CONTROLLING SAME

BACKGROUND OF THE INVENTION

Field of the Invention

The present invention relates to an image reproducing apparatus which reproduces selected images.

Description of the Related Art

Japanese Patent Application Laid-Open No. 10-224727 discusses an imaging apparatus which simultaneously captures a still image and a moving image and records association information.

Such an imaging apparatus makes it possible, when reproducing images, to reproduce part of a moving image associated with a still image from a playback of the still image.

SUMMARY OF THE INVENTION

The present invention is directed to an image reproducing apparatus that can prevent a redundant playback in which the still image and the moving image overlap each other, when selecting and reproducing reproduction target images from a plurality of images including a still image and a moving image associated with the still image.

According to aspect of the present invention an image reproducing image includes a determination unit configured to determine a plurality of images to be reproduced from among images recorded in a recording medium, wherein the determination unit determines a still image or a portion of moving image as the image to be reproduced, and a reproduction control unit configured to sequentially reproduce the plurality of images determined by the determination unit to be reproduced, wherein the still image and the moving image including the portion in which the still image is inserted is stored in the recording medium, and wherein the determination unit selects the plurality of images to be reproduced so that both the still image and the portion of moving image in which the still image is inserted are not to be reproduced.

According to another aspect of the present invention, a method for controlling an image reproducing apparatus includes selecting a plurality of images to be reproduced from images recorded in a recording medium, wherein a still image or a portion of moving image is selected as the image to be reproduced, and performing control to sequentially reproduce the plurality of image selected to be reproduced, wherein the still image and the portion of the moving image in which the still image is inserted is recorded in the recording medium, wherein in the selecting, control is performed so that both a still image and a portion of a moving image in which the still image is inserted are not selected to be reproduced.

Further features of the present invention will become apparent from the following description of exemplary embodiments with reference to the attached drawings.

BRIEF DESCRIPTION OF THE DRAWINGS

FIGS. 6A, 6B, and 6C are diagrams showing a configuration of images captured in the still/moving image capturing in the simultaneous recording mode according to the present invention and chapter reference information.

FIG. 8 is a flowchart showing an operation of image reproduction processing according to the present invention.

FIG. 9 is a flowchart showing chapter search processing in the image reproduction processing according to the present invention.

FIGS. 10A to 10E are diagrams showing chapter state information generated in the still/moving image capturing in the simultaneous recording mode according to the present invention.

FIG. 13 is a diagram showing moving image recording patterns.

FIG. 14 is a diagram showing a relationship between various settings and the moving image recording patterns.

DESCRIPTION OF THE EMBODIMENTS

Various exemplary embodiments, features, and aspects of the invention will be described in detail below with reference to the drawings.

In the present first exemplary embodiment, a digital camera 100 will be described as an example of an imaging apparatus according to an exemplary embodiment of the present invention.

<Appearance of Digital Camera 100>

Figure 1:
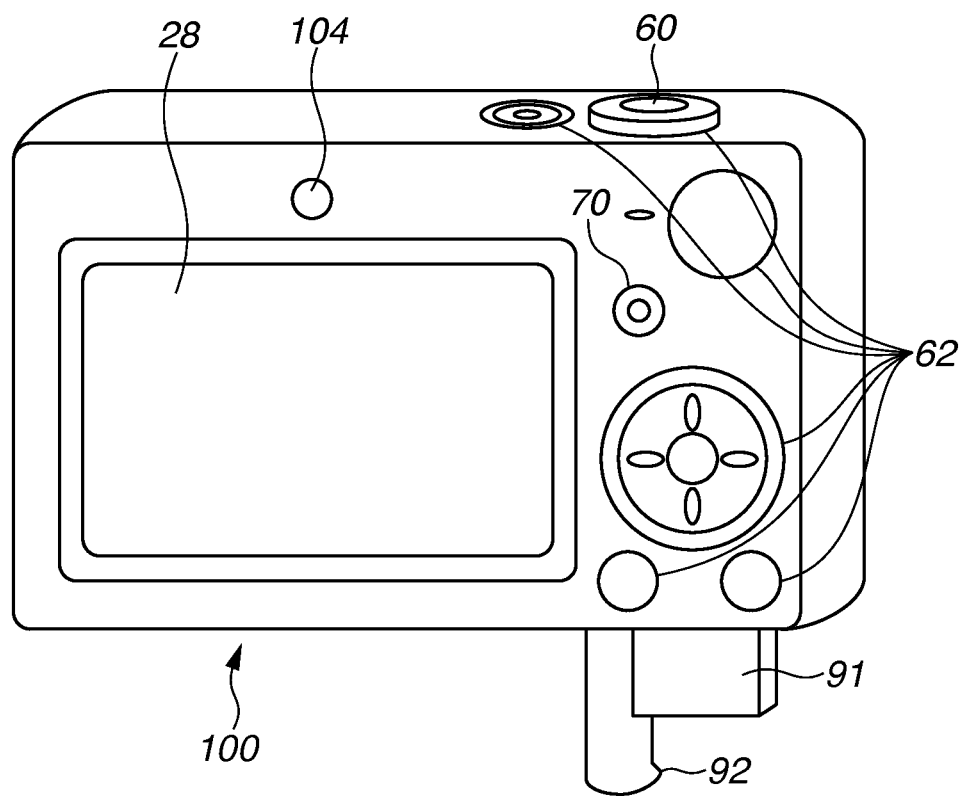
FIG. 1 is a diagram showing an appearance of an imaging apparatus according to the present invention.

FIG. 1 illustrates a rear view of the digital camera 100 as an example of the imaging apparatus according to an exemplary embodiment of the present invention.

A display unit 28 displays images and various types of information. A shutter button 60 is an operation unit for giving a still image capturing instruction. A moving image capturing button 70 is an operation member for giving a moving image capturing instruction. An operation unit 62 includes operation members such as various switches and buttons for accepting various operations from a user. The operation unit 62 includes a power switch for switching the power of the digital camera 100 on/off, a mode change switch for switching an operation mode of the digital camera 100, a menu button for making menu settings, and arrow key buttons for designating menus and settings. An external recording medium 91 is a recording medium such as a memory card and a hard disk. A lid 92 is configured to contain the recording medium 91.

A camera module 104 is configured to photograph the photographer who is photographing an object or the viewer who is viewing an image displayed on the display unit 28.

The camera module 104 includes a photographing lens and an image sensor. The camera module 104 will hereinafter be referred to as an in-camera.

To photograph the viewer or photographer, the in-camera 104 is arranged to photograph the side on which the display unit 28 of the digital camera 100 is provided. FIG. 1 is an external view of the digital camera 100 on the rear side where the display unit 28 is arranged. An out-camera, or an imaging unit for photographing the object side, is arranged on the front side of the digital camera 100. The out-camera and the in-camera 104 have optical axes (photographing directions) almost parallel to each other. The optical axis (photographing direction) of the out-camera is set opposite to the optical axis (photographing direction) of the in-camera 104.

<Configuration of Digital Camera 100>

Figure 2:
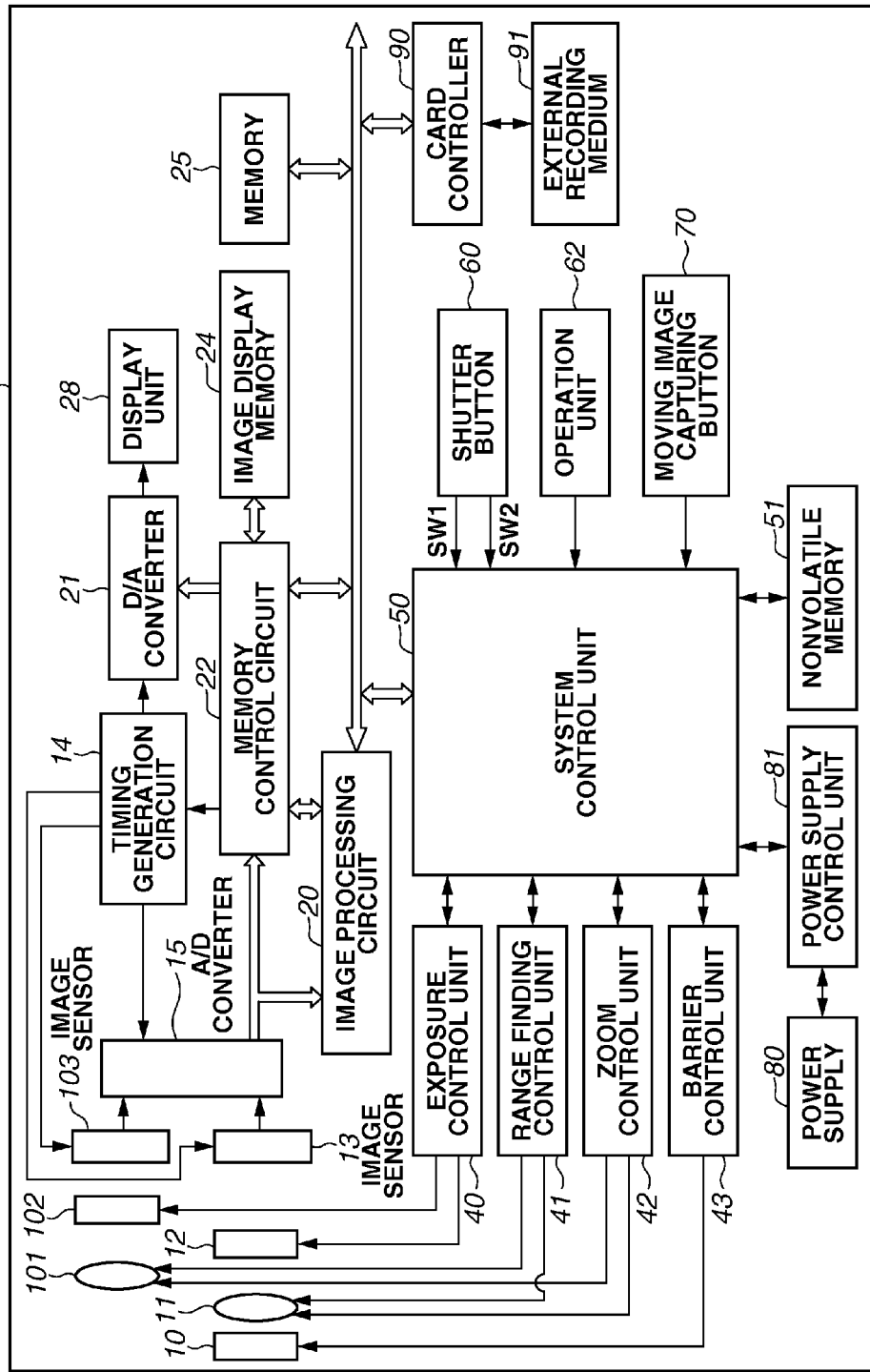
FIG. 2 is a diagram showing a configuration of the imaging apparatus according to the present invention.

FIG. 2 is a block diagram showing a configuration of the digital camera 100 which is an exemplary embodiment of the present invention.

A protection unit 10 is a protection means which is a barrier covering an imaging unit including a photographing lens 11 of the digital camera 100 to prevent the imaging unit from stain and breakage. A shutter 12 includes a diaphragm function. An image sensor 13 includes a charge-coupled device (CCD) or complementary metal oxide semiconductor (CMOS) element for converting an optical image into an electrical signal. An analog-to-digital (A/D) converter 15 is configured to convert an analog signal output of the image sensor 13 into a digital signal to obtain image data. The barrier 10, the photographing lens 11, the shutter 12, and the image sensor 13 constitute the out-camera.

The digital camera 100 includes a photographing lens 101 aside from the photographing lens 11. The photographing lens 101 is a lens group including a zoom lens and a focus lens which are installed in a direction in which the photographer using the digital camera 100 can be photographed. A shutter 102 includes a diaphragm function. An image sensor 103 includes a CCD or CMOS element for converting an optical image on the photographer side into an electrical signal. The photographing lens 101, the shutter 102, and the image sensor 103 constitute the in-camera 104.

A timing generation circuit 14 supplies a clock signal and a control signal to the image sensors 13 and 103, the A/D converter 15, and a digital-to-analog (D/A) converter 21. The timing generation circuit 14 is controlled by a memory control circuit 22 and a system control unit 50.

Whether to enable or disable an in-camera photographing function can be set to the in-camera 104. If the in-camera photographing function is enabled, an image generated based on data read from the image sensor 103, i.e., an image captured by the in-camera 104 is recorded in an external recording medium 91. If the in-camera photographing function is disabled, the image sensor 103 is not driven, i.e., the in-camera 104 does not perform photographing. Alternatively, even if the image sensor 103 is operated to perform photographing, the data is not read from the image sensor 103 and the image based on the output of the image sensor 103 is not recorded in the external recording medium 91.

An image processing circuit 20 performs predetermined pixel interpolation processing and color conversion processing on data from the A/D converter 15 or data from the memory control circuit 22.

The image processing circuit 20 performs predetermined calculation processing by using captured image data. Based on the obtained calculation result, the system control unit 50 controls an exposure control unit 40 and a range finding control unit 41 to perform automatic focus (AF) processing, automatic exposure (AE) processing, and electronic flash preliminary emission (EF) processing.

The image processing circuit 20 also performs predetermined calculation processing by using the captured image data and performs automatic white balance (AWB) processing based on the obtained calculation result.

Further, the image processing circuit 20 reads an image stored in a memory 25, performs compression processing or decompression processing by the Joint Photographic Experts Group (JPEG) method or the Moving Picture Experts Group (MPEG)-4 Advanced Video Coding (AVC)/H.264 method, and writes the processed data to the memory 25.

The memory control circuit 22 controls the A/D converter 15, the timing generation circuit 14, the image processing circuit 20, an image display memory 24, the D/A converter 21, and the memory 25.

The data from the A/D converter 15 is written to the image display memory 24 or the memory 25 via the image processing circuit 20 and the memory control circuit 22, or directly via the memory control circuit 22.

The display unit 28 includes thin-film transistors (TFTs) and a liquid crystal display (LCD). The display unit 28 performs display based on display image data written in the image display memory 24 via the D/A converter 21. By using the display unit 28, captured image data can be sequentially displayed to implement an electronic finder function for displaying a live video image. In such a manner, the display unit 28 is used to display captured images as well as a graphical user interface for making changes to menus and settings. The display unit 28 includes a terminal for outputting a video signal to an external display device such as a television set (TV). The system control unit 50 not only performs display control on the display unit 28 but may also perform control to display a captured image and/or a graphical user interface on the external display device.

The memory 25 is configured to store captured still images and moving images. The memory 25 has a storage capacity sufficient to store a predetermined number of still images and a predetermined duration of moving images. The memory 25 can also be used as a work area of the system control unit 50.

The exposure control unit 40 individually controls the shutters 12 and 102 including the diaphragm functions.

The range finding control unit 41 individually controls focusing of the photographing lenses 11 and 101. A zoom control unit 42 individually controls zooming of the photographing lenses 11 and 101. A barrier control unit 43 controls the operation of the barrier 10.

The system control unit 50 controls the entire digital camera 100.

A nonvolatile memory 51 is an electrically erasable and recordable nonvolatile memory. An electrically erasable and programmable read-only memory (EEPROM) is an example of such a nonvolatile memory 51. Programs and various types of setting information are recorded in the nonvolatile memory 51.

When a shutter button 60 is operated halfway (in a half-pressed state), a shutter switch SW1 is turned on and an SW1 signal is input to the system control unit 50. If the SW1 signal is input, the system control unit 50 issues instructions to start photographing preparation operations such as the AF processing, the AE processing, the AWB processing, and the EF processing. When the shutter button 60 is fully operated (full-pressed), a shutter switch SW2 is turned on and an SW2 signal is input to the system control unit 50. If the SW2 signal is input, the system control unit 50 issues an instruction to start operations for capturing and recording a still image to the out-camera. If the instruction to start the operations for capturing and recording a still image is issued, exposure processing is initially performed. In the exposure processing, the signal read from the image sensor 13 is passed through the A/D converter 15 and the memory control circuit 22 to write image data to the memory 25. Development processing using calculations by the image processing circuit 20 and the memory control circuit 22 is then performed on the image data written in the memory 25. The development-processed image data is compressed by the image processing circuit 20 and stored in the memory 25. The compressed image data is then read from the memory 25 and written to the external recording medium 91 via a card controller 90. In such a manner, a series of still image capturing and still image recording operations for capturing and still image data for recording is performed according to the input of the SW2 signal.

The operation unit 62 includes various buttons and a touch panel for inputting various operation instructions for the system control unit 50. The buttons include a power button, a menu button, the mode change switch for switching between a photographing mode, a reproduction mode, and other special photographing modes, arrow keys, and a set button. The buttons also include a macro button, a multi-screen reproduction page-break button, a flash setting button, and a single shooting/continuous shooting/self-timer switch button. The buttons further include a menu shift + (plus) button, a menu shift − (minus) button, a reproduction image shift + (plus) button, a reproduction image shift − (minus) button, a capturing image quality selection button, an exposure correction button, and a date/time setting button. A speech recognition device may also be used. The foregoing buttons and touch panel may be configured singly or in a plurality of combinations.

If the moving image capturing button 70 is operated (pressed), the system control unit 50 issues an instruction to start capturing a moving image to the out-camera. If the instruction to start capturing a moving image is issued, a signal is read from the image sensor 13. The A/D converter 15 converts the signal to obtain image data. The image processing circuit 20 performs moving image compression processing and stores the resultant data in the external recording medium 91. The moving image compression processing and recording processing are periodically performed to record a moving image in the external recording medium 91. The moving image compression processing and the recording processing are performed until the moving image capturing button 70 is pressed again. If the moving image capturing button 70 is pressed again, the image processing circuit 20 ends the moving image compression processing, and the moving image having been recorded so far is recorded in the external recording medium 91 as a single moving image file.

The digital camera 100 includes a power supply control unit 81.

A power supply 80 includes a primary battery such as an alkali battery and a lithium battery, a secondary battery such as a NiCd battery, NiMH battery, and Li battery, and/or an alternating-current (AC) adaptor.

The card controller 90 transmits and receives data to/from the external recording medium 91 such as a memory card.

<Still/Moving Image Capturing Simultaneous Recording Mode>

The digital camera 100 has a still/moving image capturing simultaneous recording mode as a still image capturing mode. In the still and moving image capturing simultaneous recording mode, if the shutter button 60 is full-pressed, the out-camera captures and records a still image. At the same time, a moving image captured by the out-camera before the capturing of the still image is also recorded into the external recording medium 91. In the still/moving image capturing simultaneous recording mode, a moving image (short movie) is automatically recorded in the background each time a still image is captured. The moving image (short movie) recorded in the still/moving image capturing simultaneous recording mode is always recorded in the same moving image file. A moving image of the scene when a still image is being captured can thus be automatically generated without a specific operation by the user. This can also produce a digest moving image in which moving images (short movies) obtained by a plurality of still image capturings, can be viewed in a continuous manner. The moving image file in which moving images (short movies) are recorded in the still/moving image capturing simultaneous recording mode will hereinafter be referred to as a moving image digest file. The still/moving image capturing simultaneous recording mode can be set by the user switching over a still image capturing mode setting by using the mode change switch included in the operation unit 62.

In the still/moving image capturing simultaneous recording mode, the in-camera photographing function can be enabled or disabled as described above. If the in-camera photographing function is enabled, an image captured by the in-camera 104 can be recorded, superimposed on and combined with an image captured by the out-camera. The in-camera photographing function can be enabled or disabled by the user operating the operation unit 62. Instead of the setting of the in-camera photographing function, the setting of the display of an image captured by the in-camera 104 may be made by switching-on and-off of the user's operation. In such a case, the in-camera photographing function is enabled if the display of an in-camera image is switched to on. The in-camera photographing function is disabled if the display is switched to off.

In the still/moving image capturing simultaneous recording mode, the user can operate the operation unit 62 to set stop motion to be on and off. If the stop motion is on, stop motion is generated by converting the captured still image into a moving image. The generated stop motion is recorded in the moving image file intended for the still/moving image capturing simultaneous recording mode. The stop motion means a static moving image. By repeating conversion of a piece of image data obtained when a still image is captured into moving image data, the stop motion of the determined time is generated. Since the moving image data is generated from one piece of the image data, a motionless moving image is obtained in which the same image continues. The stop motion is recorded subsequent to the moving image (short movie) before the capturing of the still image. If the stop motion setting is set to be off, no stop motion is generated or recorded. If the stop motion setting is set to be on and the in-camera photographing function is enabled, a combined moving image obtained by combining a moving image captured by the in-camera 104 with a stop motion picture of the captured still image is recorded.

If the still/moving image capturing simultaneous recording mode is set and the moving image capturing button is pressed, the out-camera starts processing for capturing and recording a moving image without capturing a still image. If the in-camera photographing function is enabled, the moving image is recorded, combined with a moving image captured by the in-camera 104. If the in-camera photographing function is disabled, only the moving image captured by the out-camera is recorded.

In other words, when the still/moving image capturing simultaneous recording mode is set, a still image and a moving image are both recorded if an instruction to capture a still image is given by the shutter button 60. If an instruction to capture a moving image is given by the moving image capturing button 70, a moving image is recorded without a still image.

<Photographing Processing in Still Image/Moving Image Capturing Simultaneous Recording Mode>

Figure 3:
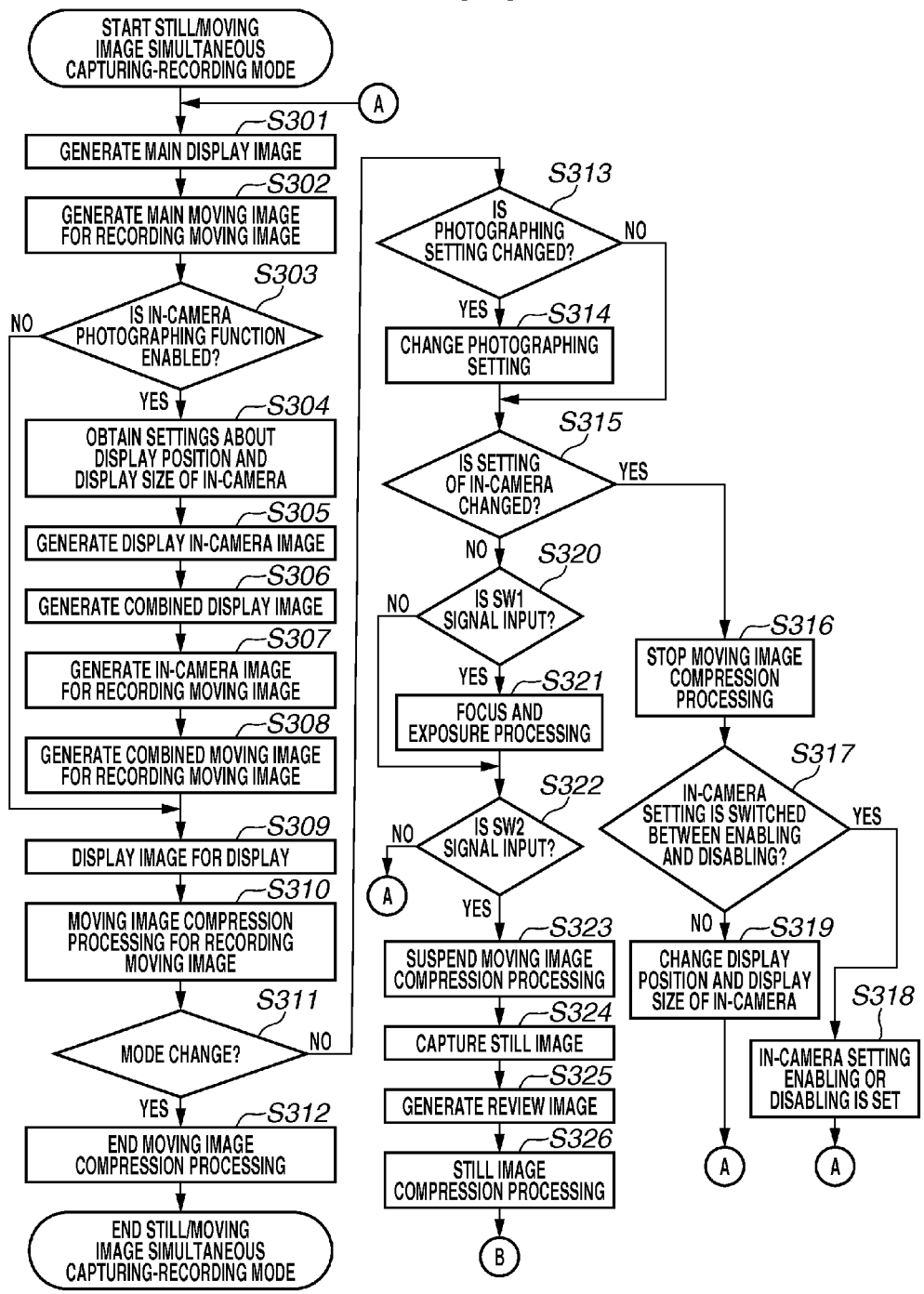
FIG. 3 is a flowchart showing an entire operation of still/moving image capturing in a simultaneous recording mode according to the present invention.
Figure 4:
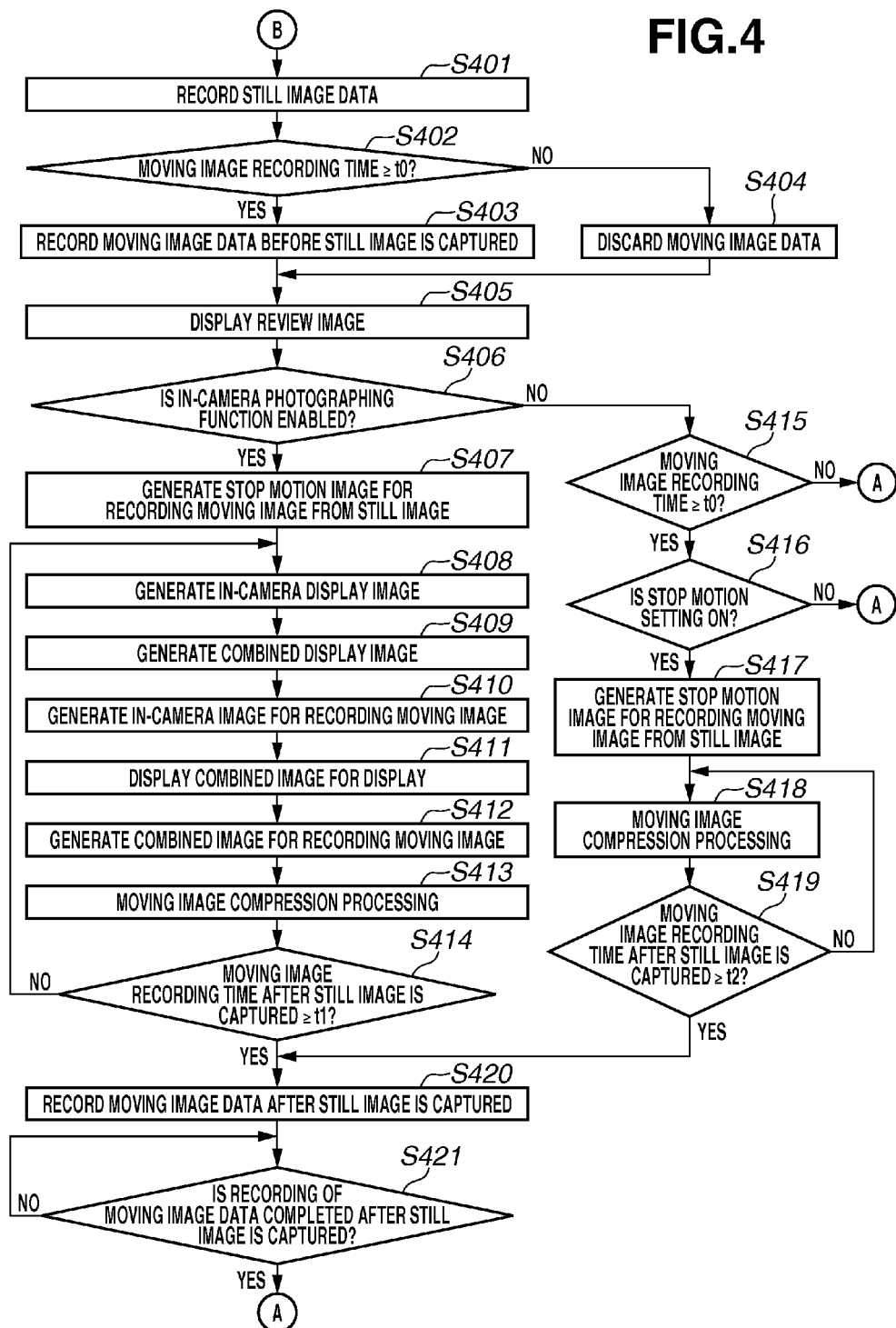
FIG. 4 is a flowchart showing an operation after photographing in the still/moving image capturing in the simultaneous recording mode according to the present invention.

FIGS. 3 and 4 illustrate a photographing operation of the digital camera 100 in the still/moving image capturing simultaneous recording mode. Such processing is implemented by the system control unit 50 which controls various units, performs arithmetic processing, and makes a determination based on a program read from the nonvolatile memory 51.

Initially, the user selects the still/moving image capturing simultaneous recording mode of the digital camera 100. In step S301, the system control unit 50 generates a display image based on the output of the image sensor 13 at appropriate exposure controlled by the exposure control unit 40. In other words, a display image is generated based on a main image captured by the out-camera. An image generated from the output of the image sensor 13 of the out-camera will hereinafter be referred to as a main image. The system control unit 50 temporarily stores the generated display image in the memory 25.

In step S302, the system control unit 50 generates a image for recording moving image (main moving image) based on the main image, that is the output of the image sensor 13 of the out-camera. A moving image generated from the output of the image sensor 13 of the out-camera will hereinafter be referred to as a main moving image. The system control unit 50 temporarily stores the generated image for recording moving image in the memory 25.

In step S303, the system control unit 50 checks settings about the in-camera 104 made in the digital camera 100. If the in-camera photographing function is enabled (YES in step S303), the system control unit 50 proceeds to step S304 to perform the processing of steps S304 to S308. If the in-camera photographing function is disabled (NO in step S303), the system control unit 50 proceeds to step S309 without performing the processing of steps S304 to S308.

In step S304, the system control unit 50 obtains settings about a display position and a display size of the in-camera 104 made in the digital camera 100, from the nonvolatile memory 51. In the present exemplary embodiment, the user can specify the display position and display size of the in-camera 104 from a menu. The information about the set display position and display size is stored in the nonvolatile memory 51.

In step S305, the system control unit 50 generates an in-camera display image based on the output of the image sensor 103 at appropriate exposure controlled by the exposure control unit 40. The size of the in-camera display image is generated based on the display size obtained in step S304.

Figure 5A:
FIGS. 5A and 5B are diagrams showing display examples displayed in the still/moving image capturing in the simultaneous recording mode according to the present invention.
Figure 5B:
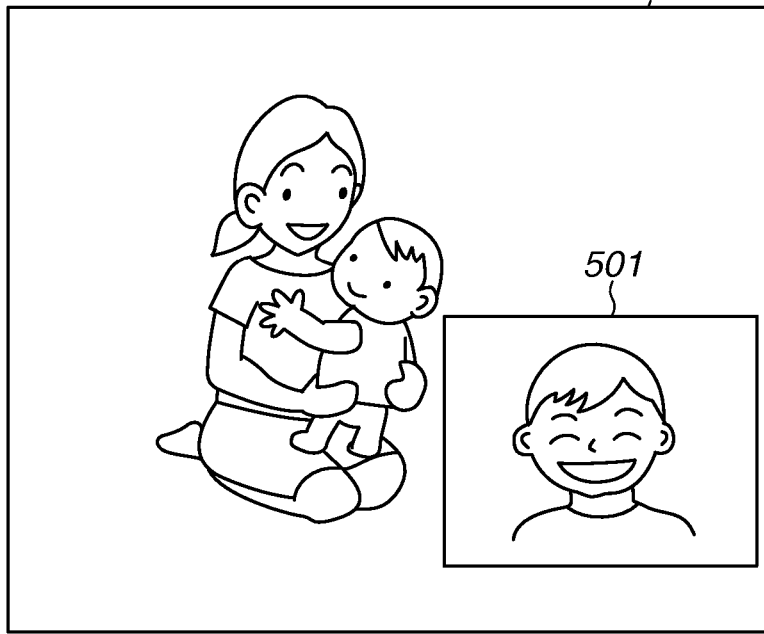

In step S306, the system control unit 50 combines the display image of the main image generated in step S301 with the in-camera display image generated in step S305 to generate a combined display image. FIG. 5B illustrates an example of the combined display image generated here, where an in-camera image is superimposed on and combined with a main image. As illustrated in FIG. 5B, when an in-camera display image 501 is arranged to be superimposed on a display main image 500, the in-camera display image 501 is superimposed at a position according to the information about the display position of the in-camera 104, obtained in step S304. The system control unit 50 temporarily stores the combined display image generated in step S306 in the memory 25, so that the display image stored in the memory 25 in step S301 is overwritten. In other words, the display image stored in the memory 25, i.e., the main image generated in step S301 is replaced with the combined display image generated in step S306. In the present exemplary embodiment, as illustrated in FIG. 5B, the in-camera image is superimposed on and combined with the main image. However, a small main image may be superimposed on and combined with the in-camera image.

In step S307, the system control unit 50 generates an in-camera moving image for recording a image based on the output of the image sensor 103 at appropriate exposure controlled by the exposure control unit 40. A moving image generated from the output of the image sensor 103 of the in-camera will hereinafter be referred to as an in-camera moving image. The size of the in-camera moving image to be generated is obtained based on the display size obtained in step S304.

In step S308, the system control unit 50 combines the main moving image for recording a moving image generated in step S302 with the in-camera moving image for recording a moving image generated in step S307 to generate a combined moving image as a moving image for recording the moving image. To make a combination with the in-camera moving image for moving image recording in a similar position to that of the in-camera display image, the in-camera moving image for moving image recording is superimposed on the recording main moving image for recording moving image to generate the combined image according to the information about the display position of the in-camera 104 like step S306. More specifically, the display image generated in step S301 or S306 and the image for recording moving image generated in step S302 or S308 are different both in the image sizes of the main image and the in-camera image. However, the display image and the image for recording moving image are generated so that the main images and the in-camera images have the same size ratios and so that the displayed images are the same as the recorded images. The system control unit 50 temporarily records the combined moving image for recording moving image generated in step S308 into the memory 25. That is, the image for recording moving image recorded in the memory 25, i.e., the main moving image generated in step S302 is replaced with the combined moving image generated in step S308.

In step S309, the system control unit 50 displays the display image temporarily stored in the memory 25 on the display unit 28. More specifically, if the in-camera photographing function is enabled, the system control unit 50 displays the combined display image generated in step S306, such as illustrated in FIG. 5B. If the in-camera photographing function is disabled, the system control unit 50 displays the main image generated in step S301, such as illustrated in FIG. 5A.

In step S310, the system control unit 50 starts moving image compression processing on the image for recording moving image. The moving image compressing processing on the image for recording moving image includes reading the image for recording moving image from the memory 25, performing moving image compression processing by the image processing circuit 20 to compress the image for recording moving image into moving image data, and storing the compressed moving image data in the memory 25. If the in-camera photographing function is enabled, the system control unit 50 generates the moving image data based on the combined moving image generated in step S308, and stores the moving image data in the memory 25. If the in-camera photographing function is disabled, the system control unit 50 generates the moving image data based on the main moving image generated in step S302, and stores the moving image data in the memory 25. Along with the compression of the moving image data, sound data input by a not-illustrated microphone is compressed and stored into the memory 25 by using sound compression processing included in the system control unit 50. The processing of step S301 to S310 is basically repeated during the still/moving image capturing simultaneous recording mode. For that purpose, up to four seconds of compressed moving image data is stored in the memory 25 in a ring-buffer form.

As described above, in steps S301 to S310, the system control unit 50 performs the processing for generating and display the processing for a display image, and the processing for generating a image for recording moving image and compressing a moving image (temporarily recording the moving image into the memory 25). Such processing is not limited to the foregoing order. The processing for generating and displaying a display image and the generation and temporary recording of an image for recording moving image may be performed in parallel.

In step S311, the system control unit 50 determines whether the still/moving image capturing simultaneous recording mode is changed. Possible mode changes include a change to another photographing mode and a change to a reproduction mode by the mode change switch, a change to a setting menu by the menu button, and power-off by the power switch. If it is determined that the still/moving image capturing simultaneous recording mode is changed (YES in step S311), the system control unit 50 proceeds to step S312. In step S312, the system control unit 50 ends the moving image compression processing, discards the moving image data and the sound data stored in the memory 25, and ends the still/moving image capturing simultaneous recording mode. In step S311, if it is determined that the still/moving image capturing simultaneous recording mode is not changed (NO in step S311), the system control unit 50 proceeds to step S313.

In step S313, the system control unit 50 checks whether a photographing setting is changed. The change of photographing setting items to be checked include photographing conditions that need to be instantly switched according to the object and/or situation at the time of photographing. For example, white balance, an exposure correction value, focus method switching such as manual focusing (MF) and macro photographing, and an image size and a compression ratio of a still image are checked. Such photographing settings are temporarily superimposed on a screen where a graphical user interface (GUI) screen for the user to change the photographing settings is displayed, according to a user operation on an assigned photographing setting change button included in the operation unit 62 or the touch panel arranged beside the display unit 28. In the GUI screen, the user can operate the operation unit 62 or the touch panel to change the photographing settings. If it is determined that a photographing setting is changed (YES in step S313), the system control unit 50 proceeds to step S314. In step S314, the system control unit 50 changes the photographing setting according to the change by the user. If no photographing setting is changed (NO in step S313), the system control unit 50 proceeds to step S315.

In step S315, the system control unit 50 checks whether a setting of the in-camera 104 is changed. Possible setting items of the in-camera 104 include ones that are settable according to user operations. The settable items include a display position, a display size, and switching of the in-camera photographing function between enabling and disabling. The user can change the settings of the setting items about the in-camera 104 by operating the operation unit 62 or the touch panel arranged beside the display unit 28.

In step S315, if it is determined that a setting of the in-camera 104 is changed (YES in step S315), the system control unit 50 proceeds to step S316. In step S316, the system control unit 50 stops the moving image compression processing and discards the moving image data and the sound data stored in the memory 25. The purpose is to prevent the moving image data from dropping in quality because the switching of the in-camera display between the moving image data having been recorded so far and the moving image data to be captured is recorded when the setting of the in-camera display is changed. In step S317, the system control unit 50 checks whether the changed setting of the in-camera 104 is the one for enabling or disabling the in-camera photographing function. In step S317, if it is determined that the in-camera photographing function is switched between enabled and disabled (YES in step S317), then in step S318, the system control unit 50 enables or disables the in-camera photographing function according to the user's instruction. The system control unit 50 then returns to step S301 and performs the processing of step S301 and subsequent steps again based on the changed setting. In step S317, if it is determined that the changed setting of the in-camera 104 is not the one for enabling or disabling the in-camera photographing function but the display position and/or display size of the in-camera 104 (NO in step S317), then in step S319, the system control unit 50 changes the display position and/or display size of the in-camera 104 according to the user's instruction. The system control unit 50 then proceeds to step S301 and performs the processing of step S301 and subsequent steps again according to the new settings.

If no setting of the in-camera 104 is changed (NO in step S315), the system control unit 50 proceeds from step S315 to step S320. In step S320, the system control unit 50 checks whether the shutter button 60 is half-pressed and the SW1 signal is input. If the SW1 signal is not input (NO in step S320), the system control unit 50 proceeds to step S322 without performing the processing of step S321. If the SW1 signal is input (YES in step S320), the system control unit 50 proceeds to step S321. In step S321, the system control unit 50 performs focus and exposure processing according to a focus mode and an exposure mode set in the digital camera 100, i.e., the aforementioned photographing preparation operations.

In step S322, the system control unit 50 checks whether the shutter button 60 is full-pressed and the SW2 signal is input. If the SW2 signal is not input (NO in step S322), the system control unit 50 returns to step S301 and repeats the processing. In step S322, if it is determined that the SW2 signal is input (YES in step S322), then in step S323, the system control unit 50 suspends the image display of the display unit 28 and suspends the moving image compression processing started at step S310. At this time, the moving image data and the sound data already stored in the memory 25 are kept stored.

In step S324, the system control unit 50 captures still image data (main still image) based on the output of the image sensor 13 of the out-camera. In step S325, the system control unit 50 generates a review image intended for an image check from the still image data (main still image) captured in step S324. In step S326, by using the image processing unit 20, the system control unit 50 performs still image compression processing on the still image data (main still image) captured in step S324 to generate still image data for recording (JPEG data), and stores the still image data for recording in the memory 25. In the still/moving image capturing simultaneous recording mode, only the main image without the combined in-camera image is recorded into the external recording medium 91 as a still image regardless of the setting for enabling or disabling the in-camera photographing function. The still image compression processing is thus performed on the main still image.

The system control unit 50 then proceeds to step S401 illustrated in FIG. 4.

In step S401, the system control unit 50 records the still image data (JPEG data) stored in the memory 25 in step S326, into the external recording medium 91 as a still image file (JPEG file).

In step S402, the system control unit 50 determines whether a moving image recording time (capturing time) of the moving image recording moving image data stored in the memory 25 is longer than or equal to a predetermined time t0. In the present exemplary embodiment, t0=2 seconds. In step S402, if the moving image recording time is determined to be longer than or equal to two seconds (YES in step S402), the system control unit 50 proceeds to step S403. If the moving image recording time is determined to be shorter than two seconds (NO in step S402), the system control unit 50 proceeds to step S404.

In step S403, the system control unit 50 records the moving image data and the sound data stored in the memory 25 into the external recording medium 91. At this time, the system control unit 50 records the moving image data and the sound data so that the moving image data and the sound data are added to the moving image digest file recorded in the external recording medium 91. If there is no moving image digest file in the external recording medium 91, the system control unit 50 may generate a new moving image digest file and record the moving image data and the sound data read from the memory 25 therein. If the photographing date is different or the size of the moving image data exceeds a predetermined size, the system control unit 50 may generate and record a new moving image digest file. The recording format of the moving image data in the external recording medium 91 will be described in detail below with reference to FIG. 6. In step S404, the system control unit 50 discards the moving image data and the sound data stored in the memory 25. In other words, if the moving image recording time (capturing time) is shorter than two seconds, the moving image data and the sound data that have been captured before the capturing of the still image in step S324 and temporarily saved to the memory 25 are neither recorded into nor saved to the external recording medium 91. The reason is that such a moving image is too short to observe the situation at the time of photographing. In the present exemplary embodiment, moving images shorter than two seconds are not recorded in the external recording medium 91.

In step S405, the system control unit 50 displays the review image generated in step S325 on the display unit 28. This display enables the user to check the captured still image.

In step S406, the system control unit 50 determines whether the in-camera photographing function is enabled or disabled. If the in-camera photographing function is determined to be enabled (YES in step S406), the system control unit 50 proceeds to step S407. In steps S407 to S414, the system control unit 50 performs processing for generating a moving image with a captured still image, with which an in-camera image is combined. If the in-camera photographing function is disabled (NO in step S406), the system control unit 50 proceeds to step S415.

In step S407, the system control unit 50 generate a stop motion image for recording a moving image from the main still image captured by the out-camera in step S324. In other words, the system control unit 50 converts the main still image into moving image data. If a still image and a moving image to be recorded in the the external recording medium 91 have different aspect ratios, the system control unit 50 performs resize processing on the main still image so that the entire main still image is included in the stop motion image. This generates the stop motion image with black areas other than the main still image. For example, if the still image has an aspect ratio of 4:3 and the moving image an aspect ratio of 16:9, the stop motion image is generated with right and left areas black.

In step S408, like step S305, the system control unit 50 generates an in-camera display image based on the output of the image sensor 103.

In step S409, like step S306, the system control unit 50 generates a combined display image. In step S409, the system control unit 50 generates the combined display image by combining the in-camera display image generated in step S408 onto the main still image captured by the out-camera in step S324.

In step S410, like step S307, the system control unit 50 generates an in-camera moving image for moving image recording based on the output of the image sensor 103.

In step S411, the system control unit 50 displays the combined display image generated in step S409 on the display unit 28. In the present case, the image captured by the in-camera 104 is displayed as a moving image on the still image that is captured by the out-camera and recorded in the external recording medium 91.

In step S412, like step S308, the system control unit 50 generates a moving image with which the in-camera moving image is combined, as a image for recording moving image. In step S412, the system control unit 50 generates the combined image for recording moving image by combining the in-camera moving image for moving image recording generated in step S410 onto the stop motion image generated in step S407.

In step S413, like step S310, the system control unit 50 performs the moving image compressing processing on the combined moving image generated in step S412 to generate moving image data, and stores the moving image data in the memory 25 as moving image after still image is captured data. Along with the compression of the moving image data, the system control unit 50 also compresses shutter sound data stored in advance in the nonvolatile memory 51 and sound data input by the not-illustrated microphone by using the sound compression processing included in the system control unit 50, and stores the resultant data in the memory 25.

In step S414, the system control unit 50 determines whether the moving image recording time (capturing time) of the moving image data after the still image is captured that is generated in step S413 and stored in the memory 25 is longer than or equal to a predetermined time t1. In the present exemplary embodiment, t1=2 seconds. If the moving image recording time of the moving image data after the still image is captured is determined to be longer than or equal to two seconds (YES in step S414), the system control unit 50 proceeds to step S420. If the moving image recording time of the moving image data after the still image is captured is determined to be shorter than two seconds (NO in step S414), the system control unit 50 proceeds to step S408 to repeat the processing of steps S408 to S414. More specifically, if the in-camera photographing function is enabled, the in-camera 104 captures a moving image until the moving image recording time of the moving image data after the still image is captured reaches two seconds after the review display of the still image is started. The display of the image obtained by combining the stop motion image with the in-camera moving image, and the moving image compression processing of the combined image are repeated until the moving image recording time of the moving image data after the still image is captured reaches two seconds.

The in-camera 104 is capturing the moving image when the still image captured by the out-camera and recorded in the external recording medium 91 is displayed in step S411. Facial expressions of the user (photographer) who is checking the captured still image on the display unit 28 can thus be captured by the in-camera 104 and recorded with the still image.

In step S415, the system control unit 50 determines whether the moving image recording time (capturing time) of the moving image recording moving image data captured before the capturing of the still image is longer than or equal to t0. Instead of the determination of the moving image recording time, the system control unit may determine whether processing for cancelling the moving image data is performed in step S404. If the moving image recording time before the still image is captured (the moving image recording moving image data captured before the capturing of the still image) is shorter than t0 and accordingly the cancel processing is performed (NO in step S415), the system control unit 50 returns to step S301 to repeat the processing from the beginning. If the system control unit 50 determines that the moving image recording time before the still image is captured is longer than or equal to t0 and the cancel processing is not performed (YES in step S415), the system control unit 50 proceeds to step S416.

In step S416, the system control unit 50 determines whether the stop motion setting is on or off. If the stop motion setting is on (YES in step S416), the system control unit 50 proceeds to step S417. If the stop motion setting is off (NO in step S416), the system control unit 50 returns to step S301.

In step S417, like step S407, the system control unit 50 generates a stop motion image.

In step S418, the system control unit 50 performs the moving image compression processing on the stop motion image generated in step S417 and stores the resultant data in the memory 25 as the moving image data after the still image is captured. The sound data to be compressed at this time includes the shutter sound data and silence data stored in the nonvolatile memory 51 in advance.

In step S419, the system control unit 50 determines whether the moving image recording time (capturing time) of the moving image data after the still image is captured on which the moving image compression processing is performed in step S418 and that is temporarily stored in the memory 25 is longer than or equal to a predetermined time t2. In the present exemplary embodiment, t2=1 second. Until the moving image recording time of the moving image data after the still image is captured is determined to be longer than or equal to one second in step S419 (YES in step S419), the system control unit 50 repeats the moving image compression processing (step S418), in which by using the same stop motion image generated in step S417, moving image compression processing (step S418) is repeated. The resultant data (moving frame) newly generated by the repeating continues to be added to the moving image data after the still image already stored in the memory 25. Accordingly, by repeating the moving image compression processing (step S418), the number of moving frames in the moving image data after the still image increases and the moving image recording time of the moving image data after the still image increases. Since the resultant data (moving frame) generated using the same stop motion image is repeatedly recorded, the moving image data after the still image becomes a static moving image.

In step S420, the system control unit 50 records the moving image data after the still image is captured generated by the moving image compression processing in step S413 or S419 in the external recording medium 91. The system control unit 50 records the moving image data after the still image is captured so that, like step S403, the moving image data after the still image is captured is added to the moving image data and the sound data of the moving image digest file. More specifically, if the moving image data before the capturing of the still image is recorded in step S403, the moving image data after the still image is captured is recorded subsequent to the moving image data before the still image is captured.

In step S421, the system control unit 50 determines whether the recording of the moving image data after the still image is captured in step S420 is completed. If it is determined that the recording of the moving image data after the still image is captured is completed (YES in step S421), the system control unit 50 deletes the moving image data temporarily stored in the memory 25 and returns to step S301.

<Various Settings and Moving Image Recording Patterns of Moving Images to be Recorded>

Next, moving image data to be recorded in the external recording medium 91 when the foregoing photographing processing is performed in the still/moving image capturing simultaneous recording mode, will be described with reference to FIGS. 13 and 14.

FIG. 13 is a diagram for describing moving image recording patterns. FIG. 14 is a diagram showing a relationship between the setting of the in-camera photographing function, a recording time (capturing time) of the moving image data before the still image is captured, the stop motion setting, and the patterns of moving images recorded in the external recording medium 91 in the still/moving image capturing simultaneous recording mode. Here, the recording time of the moving image data before the still image is captured refers to the moving image recording time (capturing time) of the moving image data temporarily recorded in the memory 25 before the capturing of the still image.

The moving image recording patterns will be described with reference to FIG. 13.

In moving image recording pattern 1, two to four seconds of moving image before the still image is captured and two seconds of moving image after still image is captured are recorded. In moving image recording pattern 1, a moving image obtained by combining an in-camera moving image captured by the in-camera 104 with a main moving image captured by the out-camera is recorded as the moving image before the still image is captured. The moving image obtained by combining an in-camera moving image obtained by the in-camera 104 with stop motion generated from a still image captured by the out-camera is then recorded as the moving image after still image is captured. Ambient sound input by the microphone is recorded as sound data of the moving image before the still image is captured. As for sound data of the moving image after still image is captured, the shutter sound data is initially recorded, followed by ambient sound.

In moving image recording pattern 2, no moving image before the still image is captured is recorded and only two seconds of moving image after still image is captured is recorded. In moving image recording pattern 2, a moving image obtained by combining an in-camera moving image captured by the in-camera 104 with stop motion generated from a still image captured by the output camera is recorded as the moving image after still image is captured. For the sound data of the moving image after still image is captured, the shutter sound data is initially recorded, followed by ambient sound. In other words, in moving image recording pattern 2, the moving image data and the sound data of the moving image after still image is captured are recorded in the same format as that of the moving image after still image is captured and recorded in moving image recording pattern 1.

In moving image recording pattern 3, two to four seconds of moving image before the still image is captured and one second of moving image after still image is captured are recorded. In moving image recording pattern 3, a main moving image captured by the out-camera with which no in-camera moving image is combined is recorded as the moving image before the still image is captured. Stop motion generated from a still image captured by the out-camera is then recorded as the moving image after still image is captured.

For the sound data of the moving image before the still image is captured, ambient sound input by the microphone is recorded. For the sound data of the moving image after still image is captured, only the shutter sound data is recorded, followed by silence.

In moving image recording pattern 4, only two to four seconds of moving image before the still image is captured is recorded and no moving image after still image is captured is recorded. In moving image recording pattern 4, a main moving image captured by the out-camera with which no in-camera moving image is combined is recorded as the moving image before the still image is captured. For the sound data of the moving image before the still image is captured, ambient sound input by the microphone is recorded. More specifically, in moving image recording pattern 4, the moving image data and the sound data of the moving image before the still image is captured to be recorded are recorded in the same format as the moving image before the still image is captured and recorded in moving image recording pattern 3.

Since the maximum duration of the moving image data temporarily stored in the memory 25 in the processing of steps S301 to S310 is set to four seconds, the moving image before the still image is captured is four seconds or shorter. In steps S402 to S404, the moving image before the still image is captured and stored in the memory 25 is recorded into the external recording medium 91 only if the recording time of the moving image data before the still image is captured is longer than or equal to two seconds. The moving image before the still image is captured is thus two to four seconds.

In moving image recording patterns 1 and 2, two seconds of moving image are recorded as the moving image after still image is captured. In moving image recording pattern 3, one second of moving image is recorded as the moving image after still image is captured. The reason is that in moving image recording patterns 1 and 2, the in-camera moving image is combined with the stop motion (static moving image) to record a combined moving image showing a motion. In contrast, in moving image recording pattern 3, without combining in-camera moving images, only the stop motion (static moving image) is recorded. Therefore, the motionless moving image is recorded. In the present exemplary embodiment, when recording a motion-showing combined moving image like moving image recording patterns 1 and 2, duration of the moving image to be recorded is set to two seconds (t1). When recording a motionless moving image like moving image recording pattern 3, duration the moving image to be recorded is set to one second (t2). The one second (t2) is shorter than a time to record a motion-showing combined moving image (t1).

Next, the relationship between the various settings and the moving image recording patterns will be described with reference to FIG. 14.

If the in-camera photographing function is enabled, the moving image recording pattern is either moving image recording pattern 1 or 2. More specifically, if the in-camera photographing function is enabled, the combined moving image obtained by combining an in-camera moving image with stop motion is always recorded as the moving image after still image is captured regardless of the recording time of the moving image data before the still image is captured and the stop motion setting. Facial expressions and reactions of the photographer who is viewing the still image can thus be recorded. If the in-camera photographing function is enabled, whether to record the combined image obtained by combining an in-camera moving image with a main moving image as the moving image before the still image is captured, depends on whether the recording time of the moving image data before the still image is captured is greater than or equal to two seconds. In other words, recording of the combined image depends on whether the recording time is greater than or equal to the predetermined time t0. If the recording time of the moving image data before the still image is captured is greater than or equal to two seconds (t0), the moving image before the still image is captured is recorded. As a result, the statuses and expressions of the object and the photographer immediately before the capturing of the still image can be recorded. If the recording time of the moving image data before the still image is captured is less than two seconds (t0), the moving image before the still image is captured is not recorded.

If the in-camera photographing function is disabled and the recording time of the moving image data before the still image is captured is less than two seconds (t0), no moving image (moving image before the still image is captured or moving image after still image is captured) is recorded regardless of the stop motion setting. As described in steps S402 to S404, the moving image before the still image is captured is not recorded since the recording time of the moving image before the still image is captured is less than two seconds. Depending on the stop motion setting, stop motion can be recorded as the moving image after still image is captured. However, in a case where the in-camera capturing function is disabled, the stop motion will not be combined with an in-camera moving image. Without the combination of an in-camera moving image, the resulting moving image will be motionless. If the in-camera photographing function is disabled and the recording time of the moving image before the still image is captured is less than two seconds, the moving image after still image is captured is therefore not recorded, either, regardless of the stop motion setting.

If the in-camera photographing function is disabled and the recording time of the moving image data before the still image is captured is greater than or equal to two seconds, the moving image recording pattern is either moving image recording pattern 3 or 4 and the moving image before the still image is captured is recorded. Changes of the statuses and facial expressions of the object immediately before the capturing of the still image can thus be recorded. Whether to record the moving image after still image is captured is determined according to the stop motion setting. If the stop motion setting is on, the moving image recording pattern is moving image recording pattern 3. In that case, stop motion is recorded without combining an in-camera moving image as the moving image after still image is captured. If the stop motion setting is off, the moving image recording pattern is moving image recording pattern 4, in which case no moving image after still image is captured is recorded. In moving image recording pattern 3, motionless stop motion is recorded as the moving image after still image is captured. Recording both the moving image before the still image is captured and the stop motion can enable the user to check both the images before and at the time of capturing of the still image. Accordingly, the motionless stop motion is recorded.

If the recording time of the moving image data before the still image is captured is greater than or equal to two seconds (t0), the moving image recording pattern is moving image recording pattern 1, 3, or 4 and the moving image before the still image is captured is recorded regardless of the other settings. If the recording time of the moving image data before the still image is captured is less than two seconds (t0), the moving image recording pattern is either moving image recording pattern 2 or no moving image recorded. Usually, if the recording time of the moving image data before the still image is captured is less than two seconds, the moving images (moving image before the still image is captured and moving image after still image is captured) are not recorded. If the in-camera photographing function is enabled, an in-camera moving image can be obtained after the capturing of the still image. As in moving image recording pattern 2, a combined moving image obtained by combining the in-camera moving image with a stop motion image is thus recorded as the moving image after the still image is captured.

As described above, in the still/moving image capturing simultaneous recording mode, the photographing processing is performed as described above, whereby the moving images can be recorded in an appropriate moving image recording pattern according to the settings illustrated in FIG. 14. In the still/moving image capturing simultaneous recording mode, the moving image recording pattern of the moving images and a decision whether to record the moving images depends on the settings illustrated in FIG. 14. In the meantime, the still image is recorded in the set recording size and at the set compression ratio regardless of the settings illustrated in FIG. 14.

<Image Configuration and Moving Image Chapter Reference Information>

FIGS. 6A to 6C are diagrams for describing a configuration of images and chapter reference information about moving images recorded in the still/moving image capturing simultaneous recording mode. FIG. 6A is a diagram showing a time series relationship in capturing still images and moving images recorded in the still/moving image capturing simultaneous recording mode. FIG. 6B is a schematic diagram showing a recording format of captured still images and moving images. FIG. 6C illustrates a configuration example of chapter reference information.

A time series of imaging instructions and captured images will be described with reference to FIG. 6A. As described above, in the still/moving image capturing simultaneous recording mode, the user full-presses the shutter button 60 to give a still image capturing instruction (release), whereby the SW2 signal is input, a still image and a moving image(s) are captured, and the captured images are recorded. A still image P1 is captured according to a still image capturing instruction of release 1. A moving image M1 associated with the still image P1 is captured before the capturing of the still image P1. Similarly, moving images M2 and M3 associated with still images P2 and P3 are captured according to releases 2 and 3, respectively.

The recording format of the still images P1 to P3 and the moving images M1 to M3 captured according to the capturing operations described in FIG. 6A on the recording medium 91 will be described with reference to FIG. 6B. In the still image data recording processing of step S401 and the moving image data recording processing of steps S403 and 420, a still image file and a moving image file are recorded in the recording format described below.

The moving image M1 captured by release 1 is saved as a moving image file "MDG_0001.MOV" 622 in a directory 621 having a directory name "100_1010" indicating the photographing date, in the recording medium 91 according to the Design rule for Camera File system (DCF) rule. Subsequent filenames are also determined according to the DCF rule. The still image P1 simultaneously captured is saved as a still image file "IMG_0002.JPG" 627 in the same directory 621. The moving image M1 is recorded in moving image recording pattern 4 of FIG. 13 without a stop motion image. The moving image M1 is recorded as a moving image stream in chapter 1 (624). Next, the moving image M2 captured by release 2 is added as chapter 2 (625) in the moving image file "MDG_0001.MOV" 622. The still image P2 simultaneously captured is saved as a still image file "IMG_0003.JPG" 629 in the same directory 621. The moving image M2 is recorded in moving image recording pattern 1 or 3 of FIG. 13. The moving image recorded in chapter 2 therefore includes a stop motion image generated from the still image P2 after the moving image M2. Next, the moving image M3 captured by release 3 before the capturing of the still image P3 is not used and a stop motion image of the still image P3 is recorded like moving image recording pattern 2 of FIG. 13. The stop motion image of the still image P3 is added as chapter 3 (626) in the moving image file "MDG_0001.MOV" 622. The still image P3 simultaneously captured is saved as a still image file "IMG_0004.JPG" 629 in the same directory 621. A moving image stream, sound data, and chapter information are recorded in each chapter. Photographing time information is stored as the chapter information in the form of a character string.

When adding a chapter, chapter reference information 623 is written in a header portion of the moving image file "MDG_0001.MOV" 622. The header portion can be referred to to obtain information about each chapter without analyzing the entire moving image file 622. In the still/moving image capturing simultaneous recording mode, the system control unit 50 records still images and moving images in a directory according to the photographing date. If there is no directory corresponding to the photographing date, the system control unit 50 generates (the) one. The system control unit 50 initially generates a moving image file in the directory corresponding to the photographing date, and then generates still image files. The moving image file thus has a file number (DCF number) smaller than those of the still image files. File numbers (DCF numbers) are usually assigned in the order of generation of files. Therefore, when still image data is recorded first before the recording of moving image data like FIG. 4, the system control unit 50 may check the presence or absence of the moving image digest file corresponding to the photographing date. If there is no such moving image digest file, the system control unit 50 can generate a moving image digest file in advance before recording the still image. In such a manner, moving images captured when capturing a plurality of still images are recorded in one moving image file. The moving images captured when capturing the still images are recorded in separate chapters so that the moving images can be distinguished from each other.

Information written in the header portion will be described with reference to FIG. 6C. The header portion includes a moving image file size 631 and the total number of moving frames 632 as information about the moving image file 622, and a chapter number 633, photographing date and time information 634, a chapter start frame 635, the number of frames 636, the presence or absence and a combined position of an in-camera image 637, and stop motion information 638 as the chapter reference information 623. The moving image file size 631 is updated by the value of the moving image file size written in the file entry each time a capture is added. The total number of moving image frames 632 is similarly updated by the total number of frames each time a chapter is added. Each chapter information to be described below is added to a chapter number 633 for each chapter each time a chapter is added. In the present exemplary embodiment, the same photographing date and time as that of the related still image is set in the chapter photographing date and time 634. Photographing date and time information 704 (see FIG. 7) about a still image recorded in a still image file and the photographing date and time information 634 of the chapter reference information 623 can thus be used to associate the related still image and moving image with each other. Each chapter can be directly reproduced based on the information about the chapter start frame 635. The number of frames to be reproduced in each chapter can be determined based on the information on the number of frames 636 of each chapter. Reproduction control according to the presence or absence of an in-camera image and, for example, sequential reproduction of only chapters including an in-camera image can be performed based on the information about the presence or absence and the combined position 637 of an in-camera image. The combined position of an in-camera image can be recorded to enable trimmed reproduction of only the in-camera image. The stop motion information 638 indicates the presence or absence of stop motion and the range of frames where the stop motion is inserted. The stop motion information 638 is expressed as relative frame information within the chapter. The stop motion information 638 about chapter 1 is 0-0, which explicitly indicates the absence of stop motion. The stop motion information 638 about chapter 2 is 90-179, which indicates that the 90th frame to the 179th frame from the top of the chapter are stop motion. Since the number of frames of chapter 2 is 180, the last half is the stop motion. The stop motion information 638 about chapter 3 is 0-179, which indicates that the entire chapter 3 is stop motion since chapter 3 has a frame count of 180. According to such information, a relationship between each chapter and a corresponding still image, i.e., the presence or absence and the frame position of stop motion can be determined. Accordingly, by selecting and reproducing a group of chapters and a corresponding group of still images, the reproduction frames (the reproduction ranges of moving images) or the still images can be controlled to perform reproduction without an overlap. The chapter reference information 623 described here also needs maintenance to maintain consistency with the moving image streams each time the moving images are partly deleted or edited. The imaging apparatus according to the present exemplary embodiment appropriately maintains the pieces of information 631 to 638 according to the content of the editing. Meanwhile, if the moving image file 622 is edited by an editing apparatus that is not capable of interpreting the chapter reference information 623, the chapter reference information 622 becomes inconsistent with the moving image streams and designates incorrect frames. When the imaging apparatus according to the present exemplary embodiment uses the chapter reference information 623, the imaging apparatus therefore determines whether the moving image file size 631 written in the chapter reference information 623 coincides with the moving image file size written in the file entry. If the moving image file sizes do not coincide, the imaging apparatus determines that the chapter reference information 623 is inconsistent, and does not use the chapter reference information 623.

Alternatively, if the imaging apparatus determines that the moving image file sizes does not coincide, the imaging apparatus may generate chapter reference information 623 again from the chapter information included in the streams.

<Still Image Information>

Figure 7:
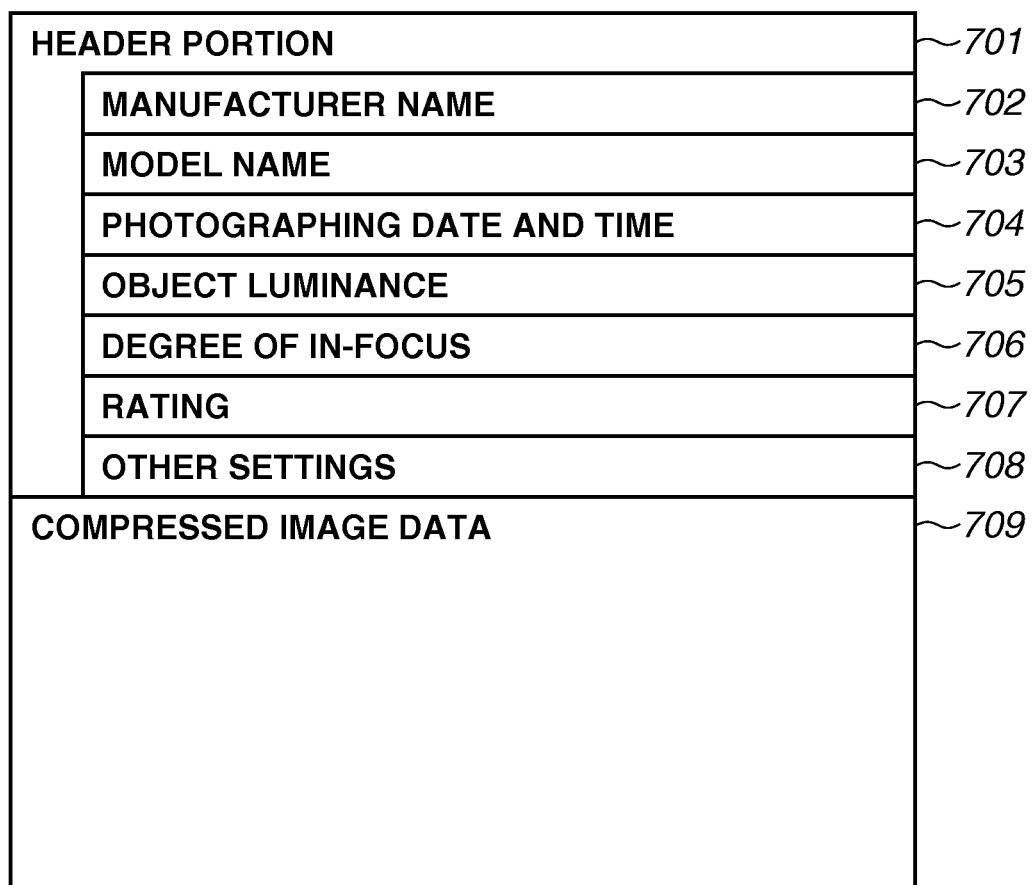
FIG. 7 is a diagram showing still image information about a still image captured in the still/moving image capturing in the simultaneous recording mode according to the present invention.

FIG. 7 illustrates a configuration example of a still image file employed in the digital camera 100. A header portion 701 describes attribute information about an image. The header portion 701 includes a manufacturer name 702 of the imaging apparatus that recorded the image, a model name 703 of the imaging apparatus that recorded the image, photographing date and time information 704 about the image, and an object luminance 705 from which overexposure and underexposure of the captured image can be determined. The degree of in-focus 706 indicates the accuracy of the result of a focusing operation by automatic focusing. A blurred image can be determined based on the degree of in-focus 706. A rating 707 gives prioritization of the image according to user instructions. Numerical values of −1 to 5 are typically used, where −1 represents an unfavorable image, 0 an unrated image, and 1 to 5 the degrees of priority increasing in proportion to the numerical values. Other settings 708 include, for example, a thumbnail image and user information. The header portion 701 is followed by a still image data body 709. In step S401, a still image file having such a configuration is recorded in the external recording medium 91.

<Image Reproduction Processing>

If the mode change switch of the operation unit is operated and a mode switch instruction signal is input to the system control unit 50, the system control unit 50 enters the reproduction mode and starts image reproduction processing. FIG. 8 is a flowchart showing the image reproduction processing. The system control unit 50 controls various units, performs arithmetic processing, and makes determinations based on a program read from the nonvolatile memory 51, whereby the flowchart of FIG. 8 is implemented.

In step S801, when placed into the reproduction mode, the system control unit 50 sets an initial image to be reproduced. An example of the initial image to be reproduced is an image having the largest DCF file number in a directory having the largest DCF directory number according to the DCF standard. More specifically, the DCF file number is incremented to determine a filename for each shot, and when performing photographing in a new directory, the DCF directory number is incremented to determine a directory name. In such a case, the initial image to be reproduced is the last captured image. In step S802, the system control unit 50 performs image reproduction processing on the image to be reproduced and displays the image on the display unit 28. In steps S803, S804, S809, S811, and S813, the user makes instructing requests via the operation unit 62, and the system control unit 50 performs processing corresponding to the instructing requests. In step S803, if the user's operation on the operating unit 62 is determined to be an instruction to end the reproduction mode (YES in step S803), the system control unit 50 exits the processing of the reproduction mode. In step S804, if it is determined that the user's operation on the operation unit 62 is an instruction to reproduce the next or previous image (image advancing instruction) (YES in step S804), then in step S805, the system control unit 50 performs image advancing processing for determining the next or previous image in order of the DCF number as an image to be reproduced. The system control unit 50 then returns to step S802 and performs the image reproduction processing on the reproduction target image determined in step S805. In step S804, if it is determined that the user's operation is not an image advancing instruction (NO in step S804), the system control unit 50 proceeds to chapter search processing of step S806. The chapter search processing is processing for identifying the unit of addition (chapter) of the moving image that was captured when the still image currently reproduced (displayed on the display unit 28) was captured. The chapter search processing will be described in detail below with reference to FIG. 9. In step S807, the system control unit 50 determines whether the chapter corresponding to the moving image associated with the currently reproduced still image is found out as a result of the chapter search processing in step S806. In step S807, if it is determined that there is the corresponding chapter as a result of step S806 (YES in step S807), the system control unit 50 proceeds to step S808. In step S808, the system control unit 50 presents a display indicating a corresponding chapter presence. The corresponding chapter presence display will be described below with reference to FIG. 12. In step S809, the system control unit 50 determines whether an instruction for chapter reproduction is given during the corresponding chapter presence display in step S809. If it is determined that an instruction for chapter reproduction is given (YES in step S809), the system control unit 50 proceeds to step S810. In step S810, the system control unit 50 performs chapter reproduction processing. In the chapter reproduction processing, the system control unit 50 reproduces a moving image to a corresponding frame number, from an initial frame corresponding to a chapter of the moving image file corresponding to the still image currently being reproduced (displayed on the display unit 28), identified by the chapter search processing of step S806, and the system control unit 50 displays the moving image on the display unit 28. After the reproduction of the corresponding chapter in step S810, the system control unit 50 returns to step S802 to reproduce (display) the current reproduction target still image. If in step S807 it is determined that there is no corresponding chapter (NO in step S807) or if in step S809 it is determined that an instruction for chapter reproduction is not given (NO in step S809), the system control unit 50 proceeds to step S811. In step S811, the system control unit 50 determines whether the user's operation on the operation unit 62 is an instruction for selected image reproduction. If it is determined that the user's operation is an instruction for selected image reproduction (YES in step S811), then in step S812, the system control unit 50 performs selected image reproduction processing. The selected image reproduction processing will be described below with reference to FIG. 11. If the user's operation is determined not to be an selected image reproduction instruction (NO in step S811), then in step S813, the system control unit 50 determines whether there is any other processing instruction. Examples of the other processing instruction are image deletion, image editing, and image transmission. If any other processing instruction is detected (YES in step S813), then in step S814, the system control unit 50 performs processing according to the instruction. The system control unit 50 then returns to step S803.

<Chapter Search Processing>

The chapter search processing for identifying a chapter corresponding to a still image will be described with reference to FIG. 9. In step S901, the system control unit 50 identifies a start point still image and obtains information about the still image. The start point still image refers to the still image that is specified by the processing in the prior stage. In the reproduction processing of FIG. 8, the start point still image refers to the currently reproduced still image. As the information about the still image, the system control unit 50 obtains information about the DCF directory name of the directory where the still image is, and the DCF filename. In step S902, the system control unit 50 identifies the moving image file corresponding to the still image identified in step S901. In the present exemplary embodiment, as described with reference to FIG. 6, for the moving image file in which the moving image associated with the still image (moving image recorded when capturing the still image) is recorded, the file having a number smaller than that of the still image in order of the DCF number is determined. The system control unit 50 may thus identify the moving image file that is close in descending order of the DCF number, descending from the start point still image. In step S903, the system control unit 50 obtains a start point still image search key. In the present exemplary embodiment, the photographing date and time is used as information for associating still images and corresponding chapters. Here, the system control unit 50 obtains the photographing date and time information 704 that is recorded in the still image file as attribute information as illustrated in FIG. 7. In step S904, the system control unit 50 identifies the corresponding chapter. More specifically, the system control unit 50 searches the chapter reference information table of FIG. 6C for a chapter having the same photographing date and time 634. Chapter information is typically included in the stream of the moving image file, and the processing for searching for corresponding information like step S904 would take long because the stream of the moving image file needs to be read. However, in the present exemplary embodiment, the chapter information is tabulated and stored in the header portion of the moving image file 622 as illustrated in FIGS. 6B and 6C. This enables high-speed search by reading a smaller amount of file. After the chapter having the same photographing date and time 634 is identified in step S904, then in step S905, the system control unit 50 determines the frames corresponding to the chapter. More specifically, in FIG. 6C, the system control unit 50 identifies the start frame 635 and the number of frames 636 corresponding to the identified chapter.

<Chapter State Information>

FIGS. 10A to 10E are conceptual tables of a data structure expressing chapter states. For example, FIG. 10A illustrates a format in which information obtained by detection information acquisition during the photographing processing is recorded. The detection information acquisition is regularly performed while capturing a moving image. The obtained information can thus be expressed as time series transition data. In the present case, an autofocus (AF) operation, a zoom control state, and rotation orientation are illustrated as respective detection information at time points of −3 second, −2 second, and −1 second, while a time point of still image capturing is 0. While the states before the still image capturing are illustrated here, the states during stop motion after the still image capturing may also be recorded.

<Image Selection Reproduction Processing>

Figure 11:
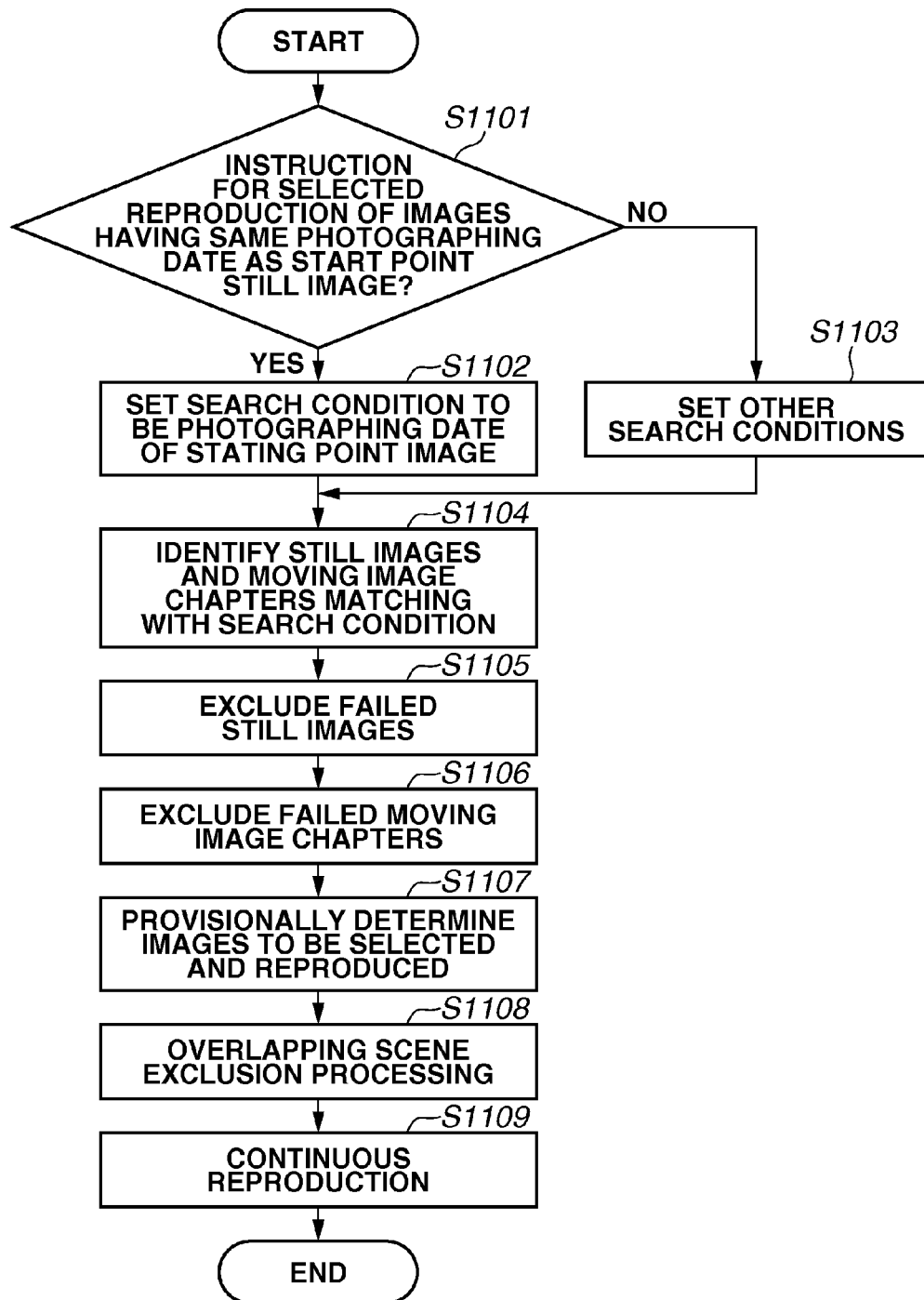
FIG. 11 is a flowchart showing selected image reproduction processing in the image reproduction processing according to the present invention.

The selected image reproduction processing in step S812 of the reproduction processing of FIG. 8 will be described with reference to FIG. 11. In the selected image reproduction processing, the user selects images (still and moving images) having the same photographing date or the same feature(s) as the start point still image, i.e., the still image displayed on the display unit 28. Reproduction control is then performed to sequentially reproduce (display) the selected images. FIG. 11 is a flowchart of the selected image reproduction processing. The flowchart is implemented by the system control unit 50, which controls various units, performs arithmetic processing, and makes determinations based on a program read from the nonvolatile memory 51.

In step S1101, the system control unit 50 determines whether the user's operation on the operation unit 62 is an instruction for selected reproduction of images having the same photographing date as that of the start point still image. If the user's operation is determined to be an instruction for the selected reproduction of images having the same photographing date as that of the start point still image (YES in step S1101), then in step S1102, the system control unit 50 sets a search condition to be still images and moving image chapters having the same photographing date as that of the start point still image in the external recording medium 91. In step S1101, if the user's operation is determined not to be an instruction for the selected reproduction of images having the same photographing date as that of the start point still image (NO in step S1101), then in step S1103, the system control unit 50 sets another search condition. Its examples are specified photographing date and time, a specified photographing date period, and a specified person. Aside from the photographing date and time, the headers of the still images and the chapter reference information 623 of the moving image file 622 may include information for identifying persons as object information. This enables selected reproduction processing by specifying a person. Both the photographing date and time, and the object information may be used to enable a search by specifying the photographing date and a person. In step S1104, the system control unit 50 identifies still images and moving image chapters matching the search condition, and lists up the header information about the identified still images and the chapter reference information 623 about the identified moving image chapters in the memory 25 as a list of items to be reproduced. The system control unit 50 may identify the still images and moving image chapters matching the search condition by referring to the header information about the still images and the chapter reference information 623 about the moving image chapters. When searching for images based on the photographing date, the system control unit 50 may identify the images included in a directory indicating the photographing date as the images matching the search condition. Such a listing operation lists the header information (the pieces of information 704 to 707 in FIG. 7) about the still images matching the search condition, the state information (FIG. 10A) about the moving image chapters matching the search condition, and the chapter reference information 623 (FIG. 6C). To reduce the load of the search and listing processing, a feature list including the needed header information about the still images and the chapter reference information 623 about the moving image chapters may be recorded in the external recording medium 91 in advance. The system control unit 50 may use such a feature list to identify (search for) the images and list up the information in the memory 25. In step S1105, the system control unit 50 performs failed image exclusion processing. In the failed image exclusion processing, the system control unit 50 deletes still images having extremely high or low object luminance 705, still images having a low degree of in-focus 706, and still images having a rating (707) of −1 in the header information listed in step S1104 from the list of items to be reproduced. In step S1106, the system control unit 50 deletes moving image chapters in which the AF operation keeps in operation without coming into focus during the photographing period as illustrated in FIG. 10B, from the list to exclude such moving image chapters from the items to be reproduced. The system control unit 50 also deletes moving image chapters in which the zoom operation continues and the viewing angle remains unstable during the photographing period as illustrated in FIG. 10C, from the list to exclude such moving image chapters from the items to be reproduced. The system control unit 50 also deletes moving image chapters in which the camera orientation varies during the photographing period as illustrated in FIG. 10D and the angle of the object is unstable at the time of reproduction, from the list to exclude such moving image chapters from the items to be reproduced.

In step S1107, the system control unit 50 provisionally determines favorable images as items to be selected and reproduced. More specifically, for example, the system control unit 50 provisionally designates one or more still images having a rating (707) of 1 or higher, as items to be reproduced. The system control unit 50 also provisionally designates moving image chapters in which an object's smiling face is detected during the photographing period as illustrated in FIG. 10E as items to be reproduced.

In step S1108, the system control unit 50 performs overlapping scene exclusion processing. In the still/moving image capturing simultaneous recording mode, stop motion may be inserted in a moving image. Suppose that a still image and its corresponding moving image chapter both remain in the list in steps S1104 to S1107, if the moving image chapter includes stop motion, reproducing both the still image and the chapter results in a redundant reproduction, including overlapping scenes. The system control unit 50 therefore performs processing for detecting and excluding overlapping scenes by using the photographing date and time information 704 about the still images selected as items to be selected and reproduced, the photographing date and time information (634) and stop motion information 638 about the moving image chapters provisionally selected as items to be selected and reproduced. If a still image and a moving image chapter selected as items to be selected and reproduced have the same photographing date and time information, the still image and the moving image chapter can be determined to be associated images. It can be determined whether the still image is inserted in the moving image chapter, and the range of insertion of the still image from the stop motion information 638. If a still image and a moving image chapter have the same photographing date and time information and the stop motion information 638 indicates the insertion of stop motion, the system control unit 50 determines that the still image and the moving image chapter include overlapping scenes. If it is determined that there are overlapping scenes, the system control unit 50 excludes either the still image or the frames of the moving image chapter where the stop motion is inserted, from the items to be selected and reproduced.

Specifically, for example, if "IMG_0003.JPG" 628 of FIG. 6 and chapter 2 (625) corresponding to this still image are selected as items to be selected and reproduced, the system control unit 50 excludes frames 90 to 179 from the reproduction range of chapter 2. That is, if the still image is to be selected, the system control unit 50 excludes the range where the still image is inserted in the moving image chapter associated with the still image, from the items to be reproduced so that only the range where the still image is not inserted serves as the reproduction range. Alternatively, the system control unit 50 may perform exclusion control not to reproduce "IMG_0003.JPG" 628 while maintaining the entire chapter 2 as an item to be reproduced. That is, if the moving image chapter in which the still image is inserted is to be reproduced, the system control unit 50 prevents the still image inserted in the moving image chapter from being included as an item to be reproduced. As another example, suppose that "IMG_0004.JPG" 629 of FIG. 6 and chapter 3 (626) corresponding to this still image are selected, from the stop motion information 638 of the chapter reference information 623, it can be seen that the overlapping frames are frames 0 to 179. The system control unit 50 then performs exclusion processing so that either the entire chapter 3 or "IMG_0004.JPG" 629 is deselected not to be reproduced. If, for example, "IMG_0002.JPG" 627 and chapter 1 (624) corresponding to this still image are selected, it can be seen from the chapter reference information 623 that there is no overlapping frame. In such a case, chapter 1 and "IMG_0002.JPG" 627 both may be selected as items to be reproduced.

In continuous reproduction in step S1109, the system control unit 50 sequentially reproduces the still images and moving image chapters selected by the foregoing processing. In the continuous reproduction, an reproduction order is determined with respect to a reproduction portion of the still image and moving image chapters selected in S1101 to S1108, and in the determined reproduction order, the images are sequentially reproduced. When the reproduction in the reproduction order is finished, the images may be repeatedly reproduced from the beginning in the reproduction order, or the reproduction may be carried out only one time. When reproducing a still image, the system control unit 50 displays the still image for a predetermined period (for example, two seconds).

In such a manner, the system control unit 50 can perform the failed image exclusion processing, the selection of favorable images, and the overlapping scene exclusion processing to perform optimum selected reproduction.

In the present exemplary embodiment, the system control unit 50 selects still images, moving image chapters, and reproduction ranges so that none of the images to be continuously reproduced includes an overlapping scene. However, a main part selected to be reproduced as described above can be continuously reproduced with an additional opening and ending, in which case overlapping scenes may be selected as a whole. For example, still images and moving image chapters used in the main part or still images or moving image chapters excluded as overlapping scenes may be selected to be reproduced in the opening and/or ending. In other words, while the system control unit 50 excludes overlapping scenes from within the main part section, the system control unit 50 may select overlapping scenes in other than the main part section, i.e., between the opening and the main part, between the main part and the ending, and/or between the opening and the ending.

<Example of Chapter Jump Display>

Figure 12A:
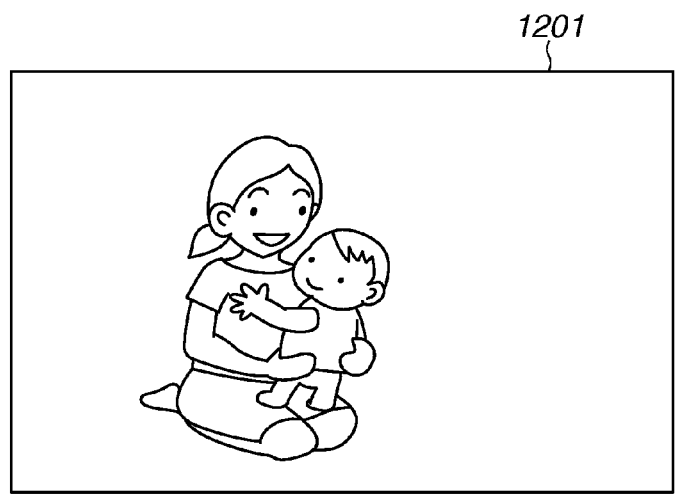
FIGS. 12A, 12B, and 12C are diagrams showing chapter jump display examples in chapter reproduction processing according to the present invention.
Figure 12B:
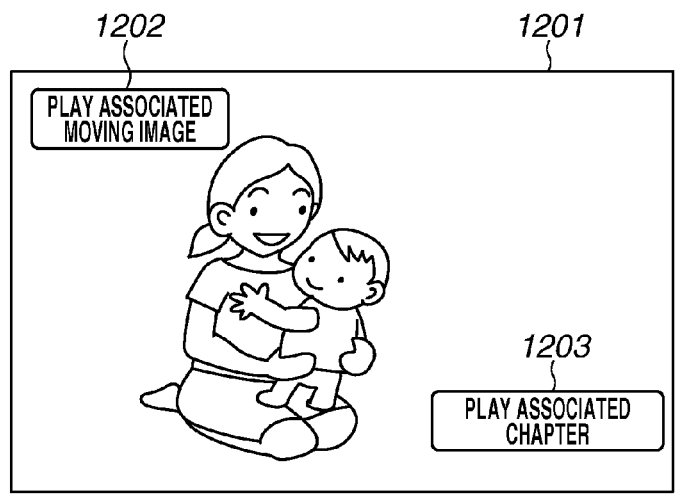
Figure 12C:
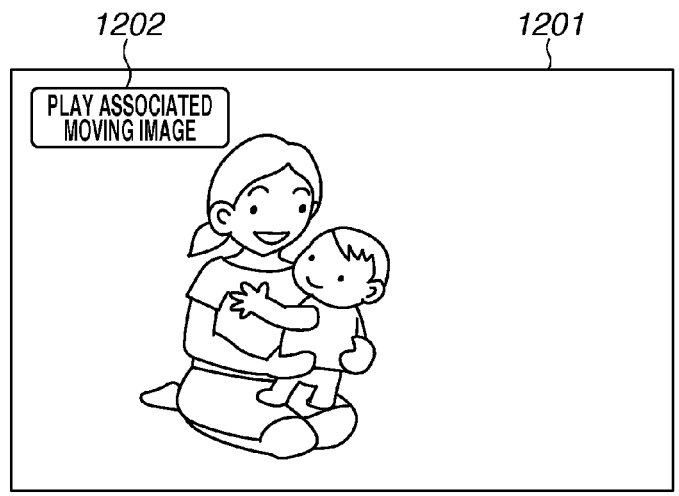

FIGS. 12A to 12C illustrate display examples of a still image in the chapter reproduction processing in step S810 of FIG. 8.

FIG. 12A illustrates a display example when there is no moving image corresponding to the still image. Only the still image is displayed.

FIG. 12B illustrates a display example when there is a chapter corresponding to the still image. A GUI button 1202 for reproducing all the corresponding moving image and a GUI button 1203 for displaying the corresponding chapter are displayed. When the GUI button 1203 is operated, among the moving image files storing the moving image relating to the displayed still image 1201, only chapters of moving images corresponding to the displayed still image 1201 are displayed. When the GUI button 1202 is operated, an entire video file including moving images relating to the still image 1201 is displayed. In the still/moving image capturing simultaneous recording mode, a plurality of the moving images relating to still images captured on the same day, is recorded in the same moving image file. Accordingly, the moving image is reproduced in which a plurality of moving images corresponding to a plurality of still image capturings is linked.

FIG. 12C illustrates a display example when there is a moving image corresponding to the still image, but not a corresponding chapter. The GUI button 1202 for displaying all the corresponding moving image is displayed. Such a display may also be used if there is a corresponding chapter as well. For example, the present imaging apparatus can superimpose and record an in-camera image on a chapter, and can switch between superimposing and non-superimposing. The GUI button 1203 may be displayed only if there is a corresponding chapter on which an in-camera image is superimposed. The GUI button 1203 may be hidden if no in-camera image is superimposed on the corresponding chapter.

Other Exemplary Embodiments

An exemplary embodiment of the present invention has been described above. The present invention is not limited to such an exemplary embodiment, and various changes and modifications may be made without departing from the gist thereof.

The foregoing exemplary embodiment has been described by using an imaging apparatus to which the present invention is applied as an example. However, an exemplary embodiment of the present invention may be applied to an electronic apparatus such as a camera-equipped mobile phone and a portable game machine. The functions of the foregoing exemplary embodiment may be implemented not by a single apparatus but by a plurality of apparatuses. For example, the functions of the foregoing exemplary embodiment may be implemented by a system in which an imaging apparatus having a plurality of imaging units, a display apparatus including a display unit, and a control apparatus including a CPU, a ROM, and a DRAM for controlling the imaging apparatus and the display apparatus are connected. The image reproduction processing may be performed not by the imaging apparatus but by an image reproducing apparatus that can obtain the images captured by the imaging apparatus. Part of the foregoing exemplary embodiment may be implemented in arbitrary combinations.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-269683 filed Dec. 26, 2013, which is hereby incorporated by reference herein in its entirety.

What is claimed is:

1. An image reproducing apparatus comprising:
one or more memories that store a set of instructions; and
one or more processors that execute the instructions to:
determine a plurality of images to be reproduced from among images recorded in a recording medium, wherein a still image or portion of moving image is determined as the image to be reproduced; and
performing control to sequentially reproduce the plurality of images determined to be reproduced,
wherein a still image and a moving image including the portion in which the still image is inserted is recorded in the recording medium;
wherein the plurality of images determined to be reproduced are capable of being selected so that both the still image and a portion of moving image are to be reproduced; and
wherein control is performed so that both the certain still image and the portion of moving image in which the certain still image is inserted are not to be reproduced.

2. The image reproducing apparatus according to claim 1, wherein the one or more processors execute the instructions to:
record a still image in the recording medium; and
record a moving image associated with the recorded still image in the recording medium, wherein the moving image in which the still image is inserted is recorded.

3. The image reproducing apparatus according to claim 1, wherein
if a still image is determined to be reproduced, a portion of a moving image in which the determined still image is not inserted, is capable of being selected as the image to be reproduced.

4. The image reproducing apparatus according to claim 1, wherein
if a portion of a moving image in which a still image is inserted is determined to be reproduced, the still image inserted in the portion of a moving image is not selected as the image to be reproduced.

5. The image reproducing apparatus according to claim 1, wherein information indicating a portion in which a still image is inserted is recorded in the recording medium.

6. The image reproducing apparatus according to claim 1, wherein the one or more processors execute the instructions to:
receive a condition of an image to be reproduced from a user, and
determine the plurality of images to be reproduced according to the condition received.

7. The image reproducing apparatus according to claim 1, wherein object information is attached to each of the plurality of images, and
the plurality of images to be reproduced is determined based on the object information.

8. The image reproducing apparatus according to claim 1, wherein photographing date and time information is attached to each of the plurality of images, and
the plurality of images to be reproduced is determined based on the photographing date and time information.

9. The image reproducing apparatus according to claim 1, wherein a plurality of moving images in which a plurality of still images is respectively inserted is recorded in the recording medium as a moving image file.

10. The image reproducing apparatus according to claim 9, wherein in the moving image file, each moving image is recorded to be distinguishable from each other.

11. The image reproducing apparatus according to claim 10, wherein each moving image is recorded as divided into a respective chapter.

12. The image reproducing apparatus according to claim 9, wherein information about whether the still images are inserted in the moving images is recorded in the moving image file.

13. The image reproducing apparatus according to claim 12, wherein information about a period in which the still images are inserted in the moving images is recorded in the moving image file.

14. The image reproducing apparatus according to claim 12, wherein the information about whether the still images are inserted in the moving images is recorded in a header portion of the moving image file.

15. The image reproducing apparatus according to claim 1, wherein the moving image is recorded as a moving image file, and information about whether the still image is inserted is recorded in a header portion of the moving image file.

16. The image reproducing apparatus according to claim 1, wherein the one or more processors execute the instructions to determine whether a still image and a moving image are associated with each other based on photographing date and time information about the still image, and photographing date and time information about the moving image.

17. The image reproducing apparatus according to claim 1, wherein the one or more processors execute the instructions to determine a portion of a moving image in which a still image is inserted based on information about a period in which the still image is inserted, the information being recorded with the moving image.

18. The image reproducing apparatus according to claim 1, wherein the one or more processors execute the instructions to determine the plurality of images to be reproduced during sequentially reproduction of the plurality of images so that in a predetermined section of the sequentially reproduction, both the still image and the portion of the moving image in which the still image is inserted are not to be reproduced, and outside the predetermined section, both the still image and the period of the moving image in which the still image is inserted are able to be reproduced.

19. A method for controlling an image reproducing apparatus, the method comprising:
    determining a plurality of images to be reproduced from images recorded in a recording medium; and
    performing control to sequentially reproduce the plurality of image determined to be reproduced,
    wherein a still image and a moving image, the moving image including a first portion in which the still image is inserted and a second portion in which the still image is not inserted, are recorded in the recording medium,
    wherein the plurality of images determined to be reproduced without user intervention is capable of being selected so that both the still image and the second portion of the moving image are to be reproduced, and
    wherein the plurality of images to be reproduced without user intervention is determined so that both the still image and the first portion of the moving image in which the still image is inserted are not to be reproduced.

20. A non-transitory computer-readable storage medium storing a program for causing a computer to execute a method for controlling an image reproducing apparatus, the method comprising:
    determining a plurality of images to be reproduced from images recorded in a recording medium; and
    performing control to sequentially reproduce the plurality of images determined to be reproduced,
    wherein a still image and a moving image, the moving image including a first portion in which the still image is inserted and a second portion in which the still image is not inserted, are recorded in the recording medium,
    wherein the plurality of images determined to be reproduced without user intervention is capable of being selected so that both the still image and the second portion of the moving image are to be reproduced, and
    wherein the plurality of images to be reproduced without user intervention is determined so that both the still image and the first portion of the moving image in which the still image is inserted are not to be reproduced.

* * * * *